(12) United States Patent
Liebe et al.

(10) Patent No.: US 10,711,842 B2
(45) Date of Patent: Jul. 14, 2020

(54) ROLLER BEARING SEAL ASSEMBLY AND A COMPONENT THEREOF

(71) Applicant: Amsted Rail Company, Inc., Chicago, IL (US)

(72) Inventors: Timothy M. Liebe, Richmond, VA (US); Michael A. Mason, Richmond, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 15/987,352

(22) Filed: May 23, 2018

(65) Prior Publication Data
US 2019/0360532 A1    Nov. 28, 2019

(51) Int. Cl.
| F16C 19/38 | (2006.01) |
| F16C 33/78 | (2006.01) |
| F16J 15/322 | (2016.01) |
| F16J 15/3268 | (2016.01) |

(Continued)

(52) U.S. Cl.
CPC ........ *F16C 33/7816* (2013.01); *F16C 19/385* (2013.01); *F16C 33/7813* (2013.01); *F16C 33/7886* (2013.01); *F16J 15/322* (2013.01); *F16J 15/3232* (2013.01); *F16J 15/3264* (2013.01); *F16J 15/3268* (2013.01)

(58) Field of Classification Search
CPC ................................................. F16C 19/385; F16C 33/7813; F16C 33/7816; F16C 33/80; F16C 33/7886; F16C 2326/10; F16C 2226/74; F16J 15/322; F16J 15/3232; F16J 15/3264; F16J 15/3268

USPC ........ 384/477, 478, 480, 484, 607; 277/353, 277/412, 459, 565, 577, 616, 620, 925, 277/419, 474–475
See application file for complete search history.

(56) References Cited

U.S. PATENT DOCUMENTS 1,978,739 A * 10/1934 Brittain, Jr. ............. B61F 15/22
277/420
3,494,682 A    2/1970 Keller
(Continued)

FOREIGN PATENT DOCUMENTS

JP    2005220940 A    8/2005

OTHER PUBLICATIONS

PCT Search Report and Written Opinion from related International Patent Application No. PCT/US19/24056; dated Jul. 22, 2019; 14 pages.

(Continued)

*Primary Examiner* — Marcus Charles
(74) *Attorney, Agent, or Firm* — Fitch, Even, Tabin & Flannery LLP

(57) ABSTRACT

In accordance with one aspect of the present disclosure, a roller bearing seal assembly is provided that includes a seal case and a rotor having a unitary, one-piece construction. The rotor is connected to the seal case and is rotatable relative to the seal case about an axis. The seal case and rotor include interfering portions that limit axial separation of the rotor and the seal case. In one embodiment, the rotor and seal case include at least one snap-fit connection that permits the rotor and seal case to be readily assembled. The at least one snap-fit connection includes the interfering portions which inhibit axial separation of the rotor and seal case after the rotor and seal case have been assembled.

26 Claims, 18 Drawing Sheets

(51) Int. Cl.
*F16J 15/3232* (2016.01)
*F16J 15/3264* (2016.01)

(56) References Cited

U.S. PATENT DOCUMENTS

| | | | |
|---|---|---|---|
| 4,458,957 A * | 7/1984 | Greener | B65G 39/09 |
| | | | 277/420 |
| 4,541,744 A * | 9/1985 | Lederman | B60G 15/068 |
| | | | 384/607 |
| 5,975,533 A * | 11/1999 | Hubbard | F16C 19/34 |
| | | | 277/351 |
| 6,386,546 B1 | 5/2002 | Fedorovich | |
| 7,534,047 B2 | 5/2009 | Reed | |
| 7,546,807 B2 | 6/2009 | Johnstone | |
| 7,549,379 B2 | 6/2009 | Monaco | |
| 7,607,836 B2 | 10/2009 | Mason | |
| 8,109,674 B2 | 2/2012 | Hubbard | |
| 8,226,299 B2 | 7/2012 | Hubbard | |
| 8,356,941 B2 | 1/2013 | Mason | |
| 8,356,945 B2 | 1/2013 | Mason | |
| 8,360,651 B1 | 1/2013 | Fetty | |
| 8,533,957 B2 | 9/2013 | Spurlock | |
| 8,556,270 B2 | 10/2013 | Toth | |
| 8,596,872 B2 | 12/2013 | Pruden | |
| 8,696,212 B2 | 4/2014 | Hubbard | |
| 8,708,571 B2 | 4/2014 | Kurohara | |
| 8,790,014 B2 | 7/2014 | Shimizu | |
| 9,150,226 B2 | 10/2015 | Rode | |
| 9,285,034 B2 * | 3/2016 | Balsells | F16J 15/3212 |
| 9,689,431 B2 | 6/2017 | Walter | |
| 9,982,719 B2 | 5/2018 | Harada | |
| 2003/0201609 A1 | 10/2003 | Hood | |
| 2007/0222161 A1 * | 9/2007 | Voydatch | F16J 15/164 |
| | | | 277/551 |
| 2008/0226212 A1 * | 9/2008 | Mason | F16C 19/386 |
| | | | 384/480 |
| 2011/0216993 A1 | 9/2011 | Mason | |
| 2014/0225333 A1 * | 8/2014 | Siegel | B60P 3/32 |
| | | | 277/630 |
| 2014/0333031 A1 | 11/2014 | Tones | |
| 2016/0223086 A1 * | 8/2016 | Balsells | F16J 15/3212 |
| 2017/0335890 A1 | 11/2017 | Harada | |

OTHER PUBLICATIONS

Invitation to Pay Additional Fees from corresponding International Application No. PCT/US19/24056; dated May 29, 2019; 2 pages.
U.S. Appl. No. 15/621,898, filed Jun. 13, 2017, James A. Hargraves.
Notification of Transmittal of International Preliminary Report on Patentability from International Patent Application No. PCT/US19/24056; dated Mar. 25, 2020; 22 pages.

* cited by examiner

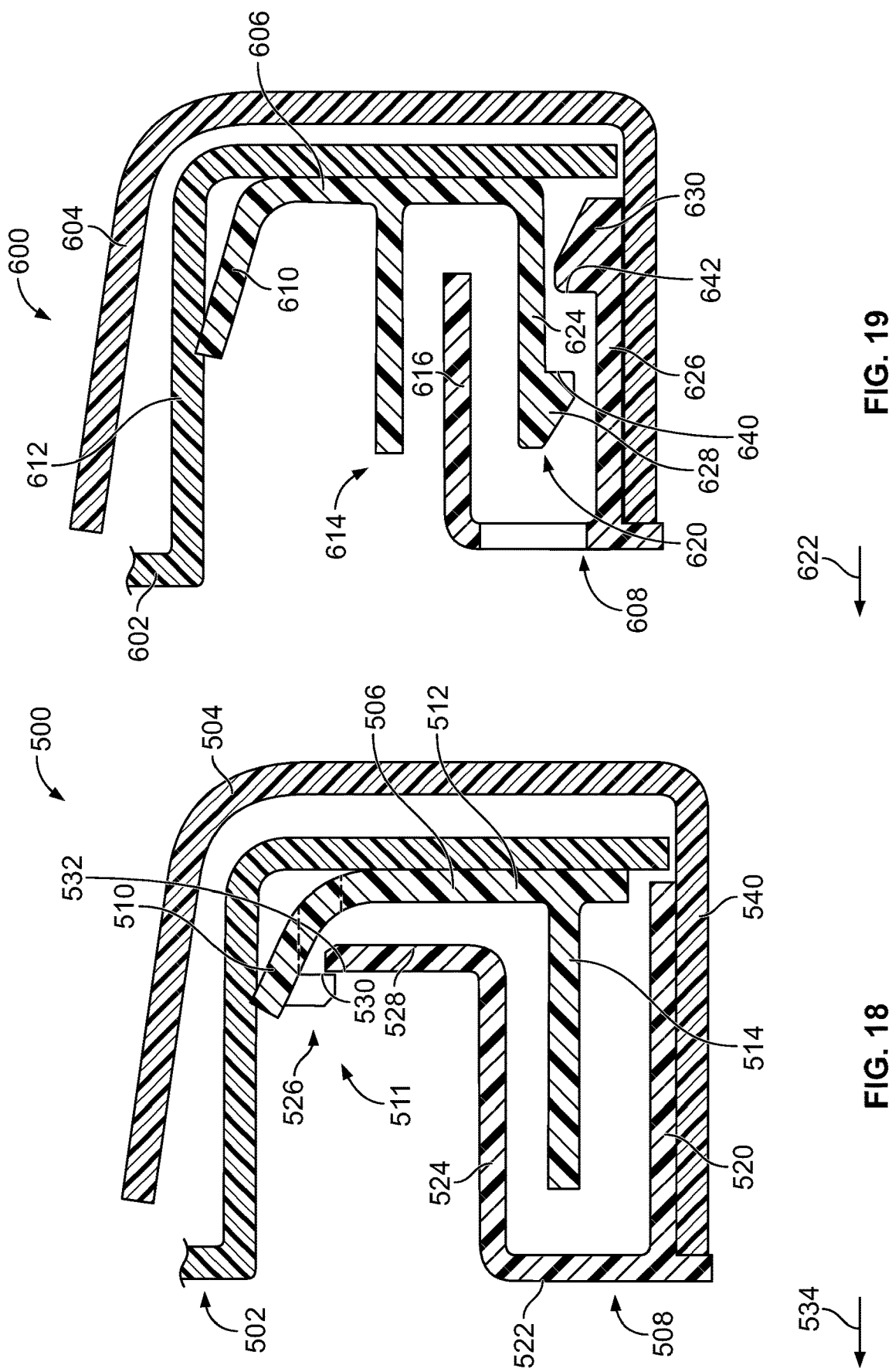

ROLLER BEARING SEAL ASSEMBLY AND A COMPONENT THEREOF

FIELD

This disclosure relates to sealed railway roller bearings and, more specifically, to components of a seal assembly for a railway roller bearing.

BACKGROUND

Railcars have undercarriage truck assemblies that include a frame, one or more wheel assemblies, and roller bearings that connect the wheel assemblies to the frame. Each wheel assembly includes an axle with journals at opposite ends thereof and wheels connected to the axle. Each roller bearing includes a first component mounted to the journal that turns with the journal and a second component that is mounted to the frame.

Various types of roller bearings are used for railcars. One type of roller bearing is a tapered roller bearing that includes one or more rows of tapered rollers. Tapered roller bearings, and other types of bearings, include a lubricant within the bearing to reduce resistance to movement between components of the bearing. Bearings may also include a seal to contain the lubricant within the bearing and to prevent water, dirt, and debris from entering the bearing.

One prior seal for a tapered roller bearing includes a seal case mounted to a bearing cup of the tapered roller bearing. The seal further includes an insert press-fit in the seal case, a rotor mounted to a journal, and a slinger connected to the rotor. During operation of the tapered roller bearing, the rotor and slinger rotate together relative to the seal case and insert as the journal turns. Further, the assembly of the seal case, insert, rotor, and slinger defines a labyrinth seal that resists egress of lubricant from the tapered roller bearing and the ingress of water and debris into the bearing.

The seal may be separately manufactured from the rest of the tapered roller bearing. In one prior approach, the seal case, insert, rotor, and slinger are assembled at a first facility, transported to a second facility, and then subsequently assembled with a bearing cup and a wear ring of the tapered roller bearing at the second facility. More specifically, the seal case and insert are assembled at the first facility by pressing the insert into the seal case. Next, the rotor is press-fit into the insert which fixes the rotor to the insert. The press-fit engagement between the rotor and the insert keeps the rotor assembled with the seal case and insert during transport. An annular inner wall of the slinger is then inserted into an opening of a slightly larger annular wall of the rotor to form a slip-fit connection therebetween. There is some nominal interference between the annular walls of the slinger and the rotor, but the slinger can shift relative to the rotor. The slinger may be made of a more pliable material than the rotor and the loose fit between the slinger and rotor permits the slinger to expand more than the rotor when the rotor/slinger assembly is subsequently press fit onto a wear ring. The assembled seal including the seal case, insert, rotor, and slinger is packaged at the first facility and transported to the second facility.

After the seal has been transported from the first facility to the second facility, an operator at the second facility removes the seal from the package. The operator inserts the seal into a press machine and operates the press machine to press a wear ring into the slinger of the seal which expands the annular wall of the slinger into tight engagement with the annular wall of the rotor and inhibits relative rotary and axial movement between the rotor and slinger. The pressing of the wear ring into the slinger also shifts the rotor axially relative to the insert and disengages the press-fit engagement between the rotor and the insert which disconnects the rotor/slinger assembly from the insert/seal case assembly. Thus, the operation of press-fitting the wear ring into the slinger both secures the wear ring to the rotor/slinger assembly and disengages the rotor/slinger assembly from the insert/seal case assembly. This disconnecting operation permits the rotor/slinger assembly to turn relative to the insert/seal case assembly with turning of the journal. Although the disconnecting operation is necessary in the prior approach to permit the rotor/slinger assembly to turn, the disconnecting operation complicates assembly of the tapered roller bearing at the second facility.

Further, the rotor and the insert are made from an injection-molded plastic and the tolerances between the rotor and the insert may be too loose or too tight which adversely affects assembly and transportation of the seal. For example, if the rotor is too loosely engaged with the insert, the slip-fit connection between the rotor and the insert may permit the rotor and the slinger to fall off of the insert/seal case assembly when the seal is removed from the package at the second facility. If the rotor is too tightly engaged with the insert, the operation of press-fitting the wear ring into the slinger may cause the rotor to rip the insert out of the seal case.

SUMMARY

In accordance with one aspect of the present disclosure, a component is provided for a railway roller bearing seal assembly. The component includes an annular body having a center axis and an intermediate annular wall of the annular body extending radially. The annular body includes a ring extending from the intermediate annular wall in a first direction parallel to the center axis. The annular body further includes at least one snap-fit member of the annular body spaced radially from the ring and extending in the first direction from the intermediate annular wall a second distance that is less than the first axial distance. The at least one snap-fit member is configured to engage a snap-fit member of another component of the roller bearing seal assembly. The at least one snap-fit member permits the component to be readily connected to the other component which makes assembly of the components easier. Further, the ring of the annular body may be configured to form at least a portion of a labyrinth seal with the other component. The intermediate annular wall spaces the ring from the at least one snap-fit member so that the ring forms the at least a portion of the labyrinth seal while the at least one snap-fit member keeps the components connected.

A roller bearing seal assembly is also provided that includes a seal case and a rotor having a unitary, one-piece construction. The rotor is connected to the seal case and is rotatable relative to the seal case about an axis. The seal case and rotor include interfering portions that limit axial separation of the rotor and the seal case. In this manner, the interfering portions keep the seal case and the rotor assembled which makes handling of the assembled seal case and rotor easer because the interfering portions resist the rotor from falling off of or otherwise disconnecting from the seal case. Further, a slinger may be slip-fit into the rotor after the seal case and rotor have been assembled. The assembled seal case, rotor, and slinger may then be shipped from a first facility to a second facility. The assembled seal case, rotor, and slinger are mounted to a wear ring at the second facility and, subsequently, to a bearing cup of a roller bearing. The interfering portions resist separation of the seal case and rotor as the assembled seal case and rotor are handled during assembly and transportation.

A method is also provided for assembling a railway roller bearing seal assembly. The method includes engaging a snap-fit connection of a rotor and a seal case that permits the rotor to rotate relative to the seal case. The snap-fit connection permits the rotor and the seal case to be readily connected which improves ease of assembly. Further, because the snap-fit connection permits the rotor to rotate relative to the seal case, the connected rotor and seal case may be installed in a roller bearing assembly without having to first disconnect the rotor from the seal case to permit the rotor to rotate relative to the seal case. This simplifies the process of assembling of the roller bearing assembly.

BRIEF DESCRIPTION OF THE DRAWINGS

FIG. 18 is a cross-sectional view of another roller bearing seal assembly showing a snap-fit connection between a rotor and an insert of the roller bearing seal assembly;

FIG. 19 is a cross-sectional view of another roller bearing seal assembly showing a snap-fit connection between a rotor and an insert of the roller bearing seal assembly;

DETAILED DESCRIPTION

Figure 1:
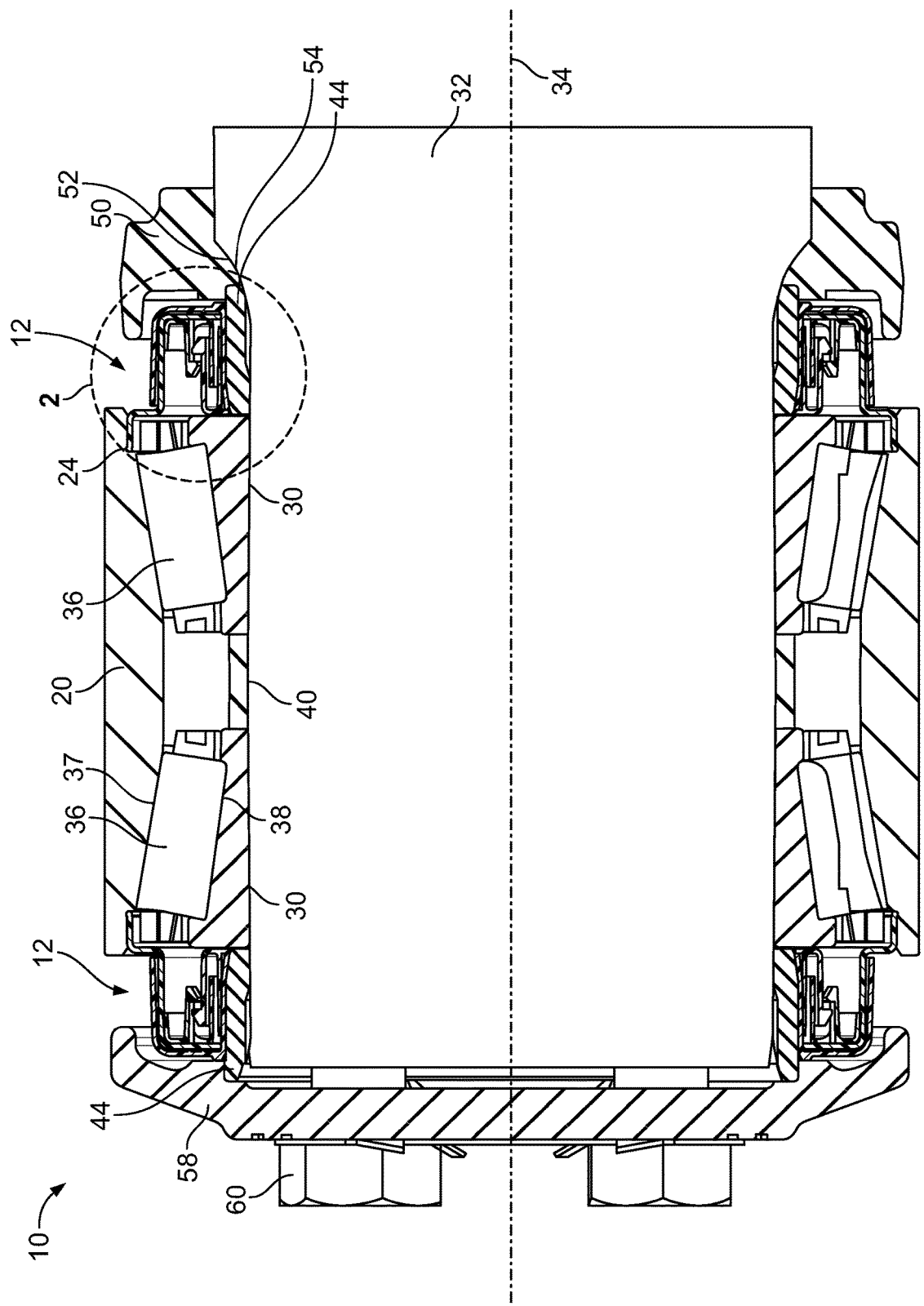
FIG. 1 is a cross-sectional view of a tapered roller bearing including a pair of roller bearing cone assemblies and associated roller bearing seal assemblies at opposite ends of a bearing cup of the roller bearing.
Figure 2:
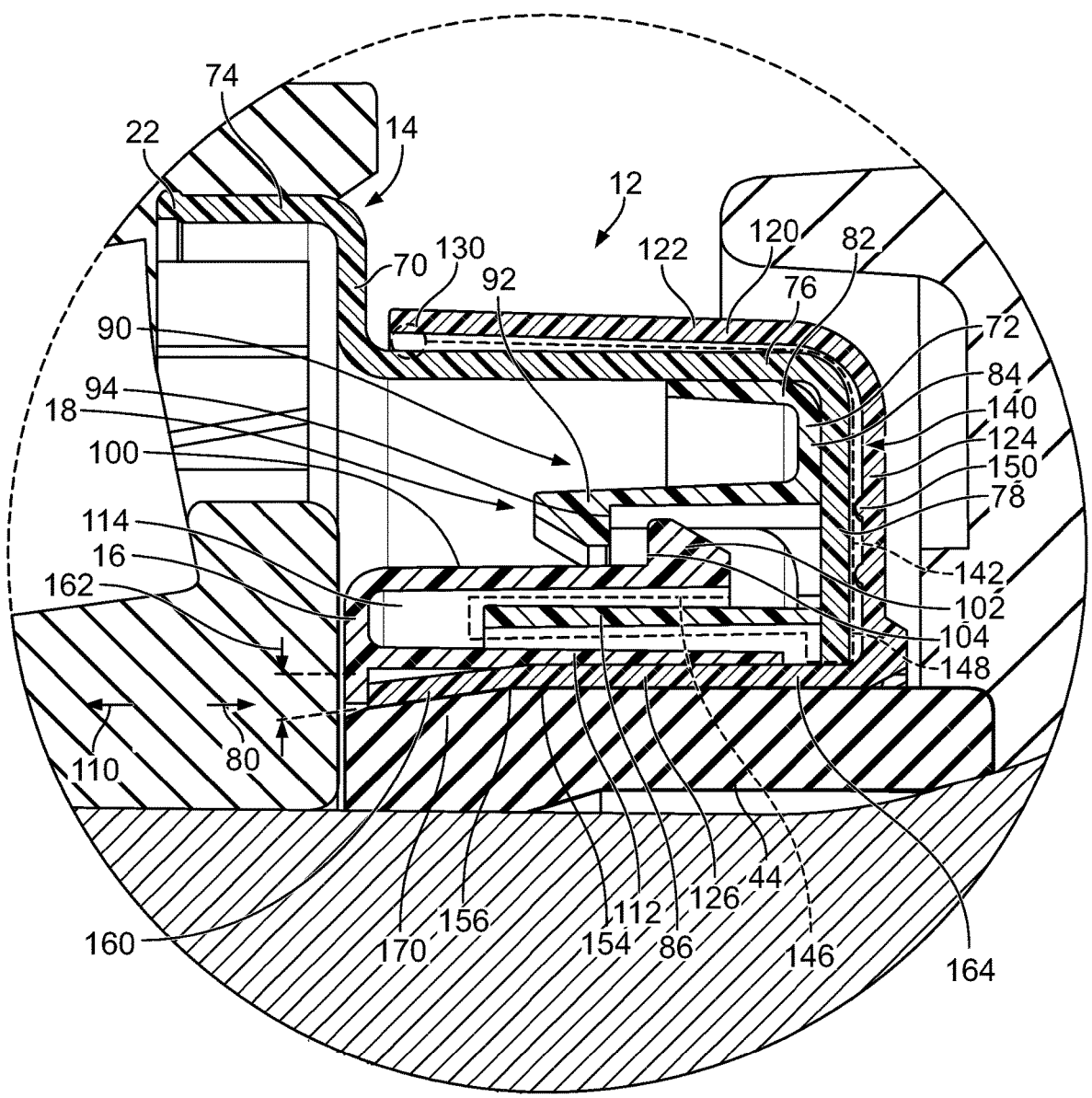
FIG. 2 is an enlarged view of the portion of FIG. 1 shown in a dashed circle and showing a snap-fit connection between an insert and a rotor of one of the roller bearing seal assemblies of FIG. 1.
Figure 3:
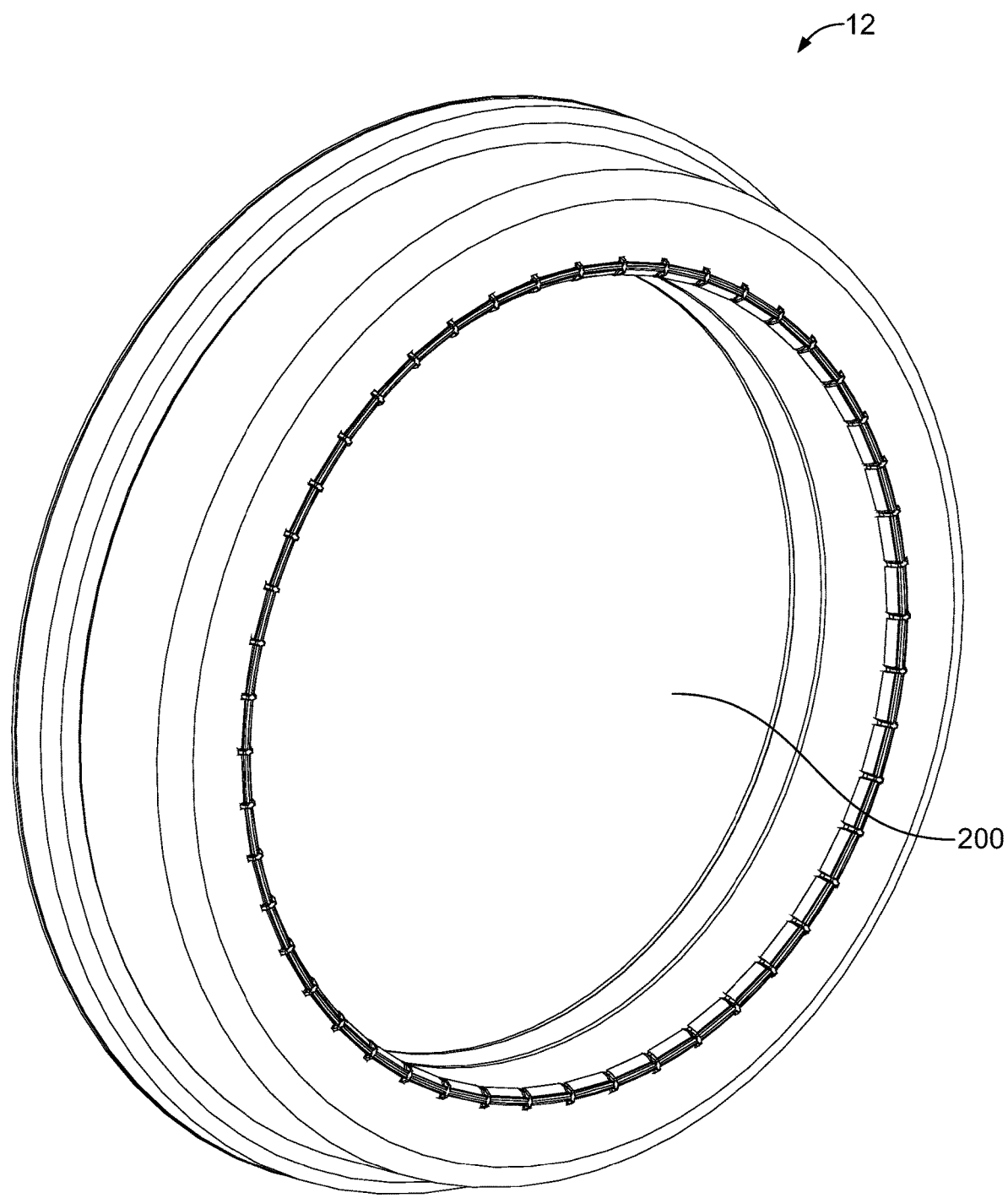
FIG. 3 is a perspective view of the roller bearing seal assembly of FIG. 2.
Figure 4:
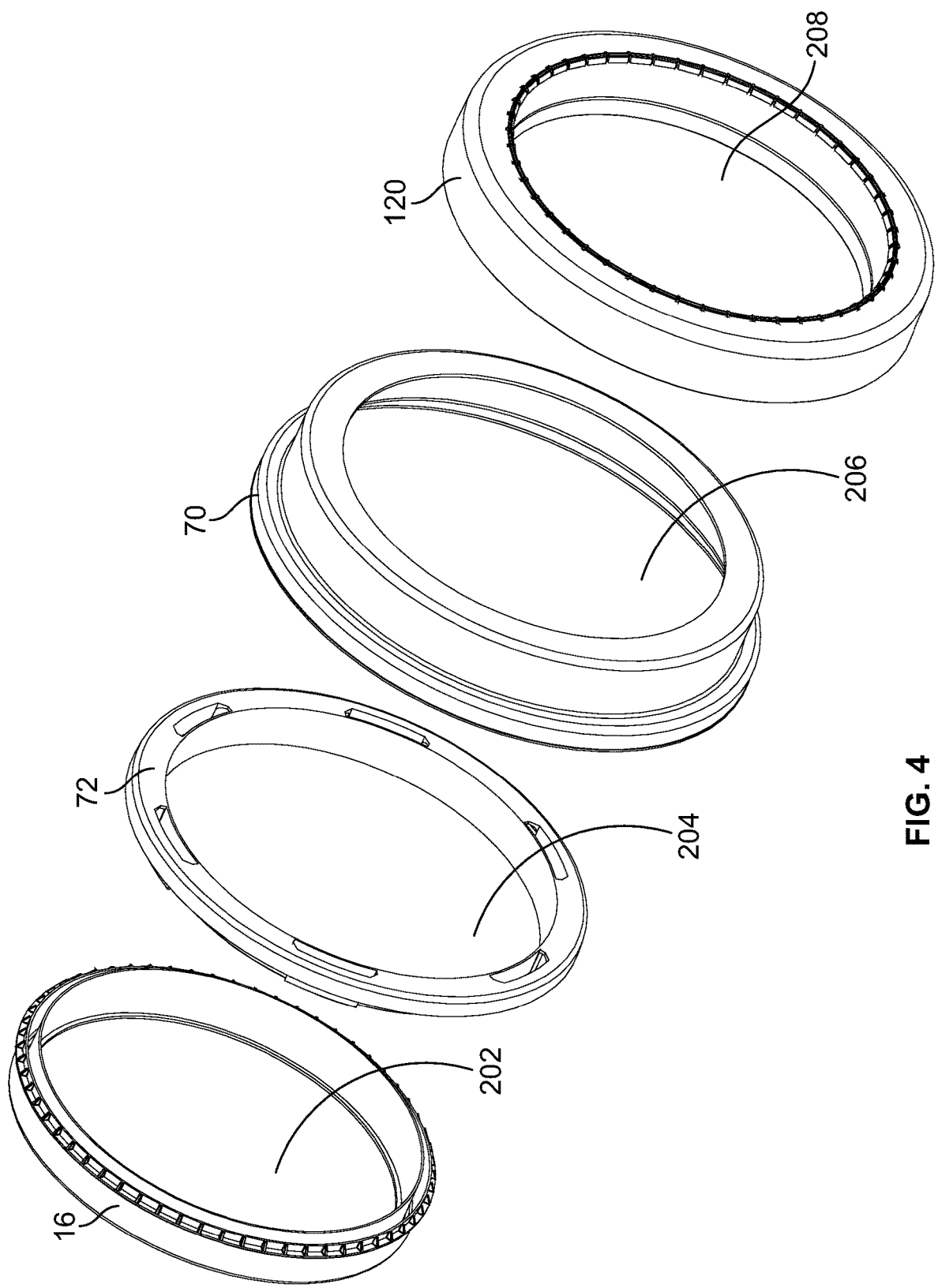
FIG. 4 is an exploded view of the roller bearing seal assembly of FIG. 3 showing the rotor, the insert, an outer case, and a slinger of the roller bearing seal assembly.
Figure 5:
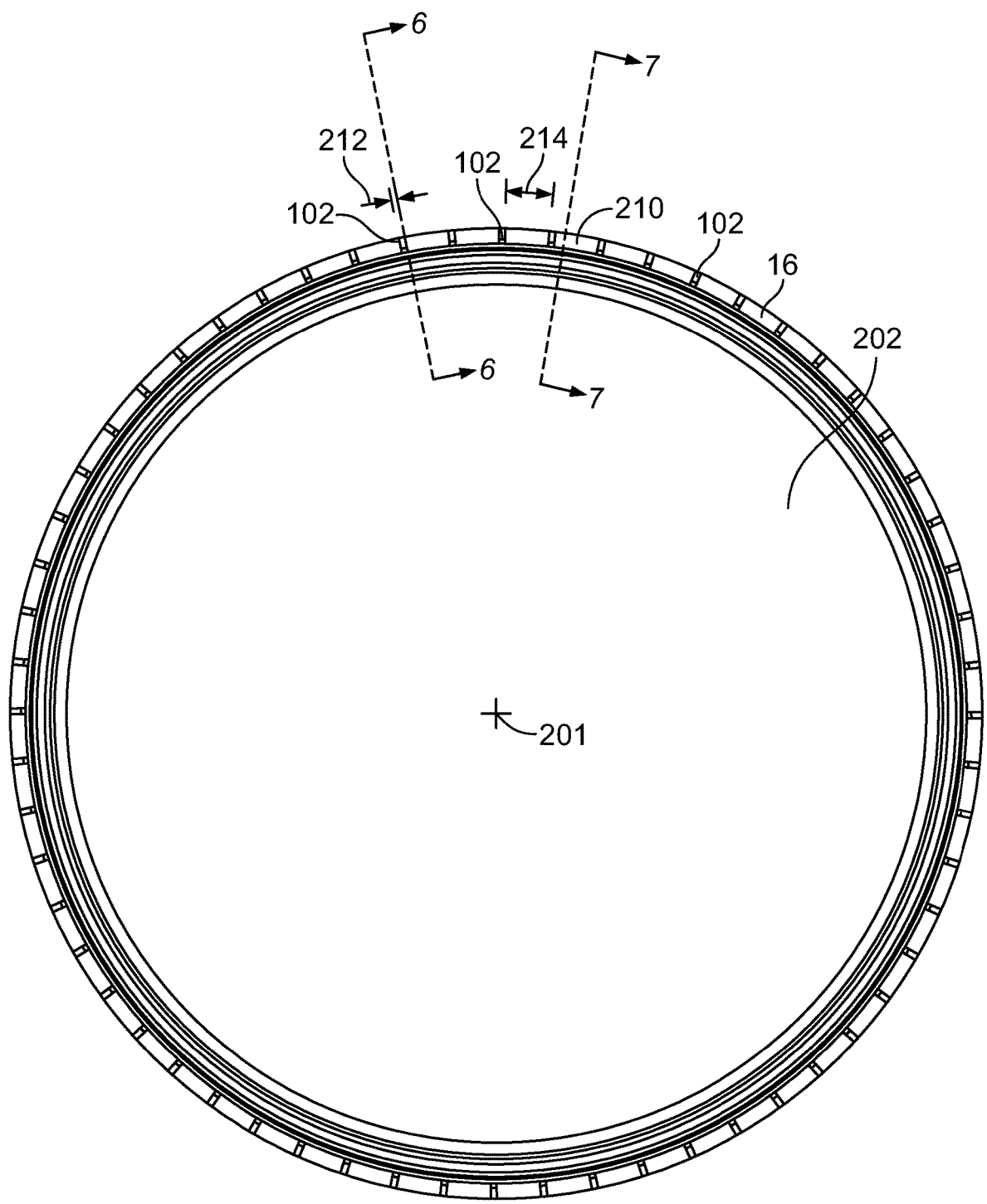
FIG. 5 is a plan view of the rotor of FIG. 4 showing tapered barbs of the rotor spaced circumferentially about the rotor.

With reference to FIGS. 1 and 2, a roller bearing 10 is provided with roller bearing seal assemblies 12 that each include a seal case 14 and a rotor 16 which form a snap-fit connection 18 therebetween that improves handling of the roller bearing seal assembly 12 during transit and assembly with other components of the roller bearing 10. The snap-fit connection 18 improves handling of the roller bearing seal assemblies 12 because, once the snap-fit connection 18 has been formed by pressing the rotor 16 into the seal case 14, the rotor 16 is kept from falling out of the seal case 14. Further, the snap-fit connection 18 permits the rotor 16 to turn relative to the seal case 14 such that the connected seal case 14 and rotor 16 can be readily mounted to a bearing cup 20 and a wear ring 44 of the roller bearing 10 during assembly of the roller bearing 10. This stands in contrast to the prior approach of pressing of a rotor out of a seal case insert to disengage the rotor from the seal case insert before the rotor can rotate relative to the seal case insert.

The bearing cup 20 may be mounted to a frame of a railcar truck. The seal case 14 is mounted to the bearing cup 20 by way of a bead 22 engaged with a groove 24 of the bearing cup 20. The roller bearing 10 includes bearing cones 30 that engage a journal 32 and are rotatable with the journal 32 about an axis of rotation 34. The roller bearing 10 includes one or more rows of tapered rollers 36 that travel along raceways 37, 38 of the bearing cup 20 and the bearing cones 30. A spacer ring 40 separates the bearing cones 30. Thus, as the journal 12 turns about the axis of rotation 34, the bearing cones 30 and spacer ring 40 turn with the journal 32 and the tapered rollers 36 roll around the raceways 37 of the bearing cup 20 and the raceways 38 of the bearing cones 30. The roller bearing 10 includes wear rings 44 on opposite sides of the bearing cones 30 and a backing ring 50. The backing ring 50 has a curved surface 52 that engages a fillet 54 of the journal 32. The roller bearing 10 further includes a retaining clamp 58 that is secured via a fastener such as bolts 60 to the journal 32. When the bolts 60 are tightened down, the retaining clamp 58 clamps the wear rings 44, bearing cones 30, and spacer ring 40 together between the retaining clamp 58 and the backing ring 50.

With reference to FIG. 2, the seal case 14 includes an outer case 70 and an insert 72 connected to the outer case 70. The outer case 70 has an outer portion 74 (which includes the bead 22), an intermediate portion 76, and an inner portion 78. As used herein, the terms outer and inner generally refer the relative radial position of the structure relative to the axis of rotation 34. The seal case 14 may include two or more assembled components or, in an alternative approach, the seal case 14 may have a unitary, one-piece construction.

The insert 72 may be connected to the outer case 70 in a number of approaches. In one approach, the insert 72 is press fit into the outer case 70 in direction 80 which is parallel to the axis of rotation 34 (see FIG. 12). The insert 72 has an outer portion, such as an outer ring 82, which engages the intermediate portion 76 of the outer case 70. The insert 72 includes an intermediate portion, such as an intermediate wall 84, extending radially inward from the outer ring 82 as well as an inner portion, such as inner ring 86. The snap-fit connection 18 includes a snap-fit member of the insert 72, such as one or more tabs 90. The tabs 90 each includes a protrusion, such as a barb 92, having a stop surface 94. In another embodiment, the seal case 14 is formed by overmolding the outer case 70 onto the insert 72.

With reference to FIG. 2, the rotor 16 includes an outer portion, such as an outer ring 100 including a barb 102. The snap-fit connection 18 includes a snap-fit member, such as the outer ring 100. The outer ring 100 includes a barb 102 having a stop surface 104 in axial overlapping relation with the stop surface 94 of the insert 72. The stop surface 104 is configured to abut the stop surface 94 and limit separation of the rotor 16 from the insert 72 in direction 110 before a slinger 120 of the roller bearing seal assembly 12 is connected to the rotor 16. Further, the intermediate wall 84 of the insert 72 (see FIG. 10) limits movement of the rotor 16 in direction 80. Thus, once the snap-fit connection 18 has been formed during assembly of the seal case 14 and the rotor 16, the rotor 16 is rotatably captured in the seal case 14. This makes the assembled seal case 14 and rotor 16 easier to handle during transit of the seal case 14 and rotor 16 and subsequent assembly of the seal case 14 and rotor 16 with other components of the roller bearing 10, such as the bearing cup 20 and the wear ring 44.

Figure 6:
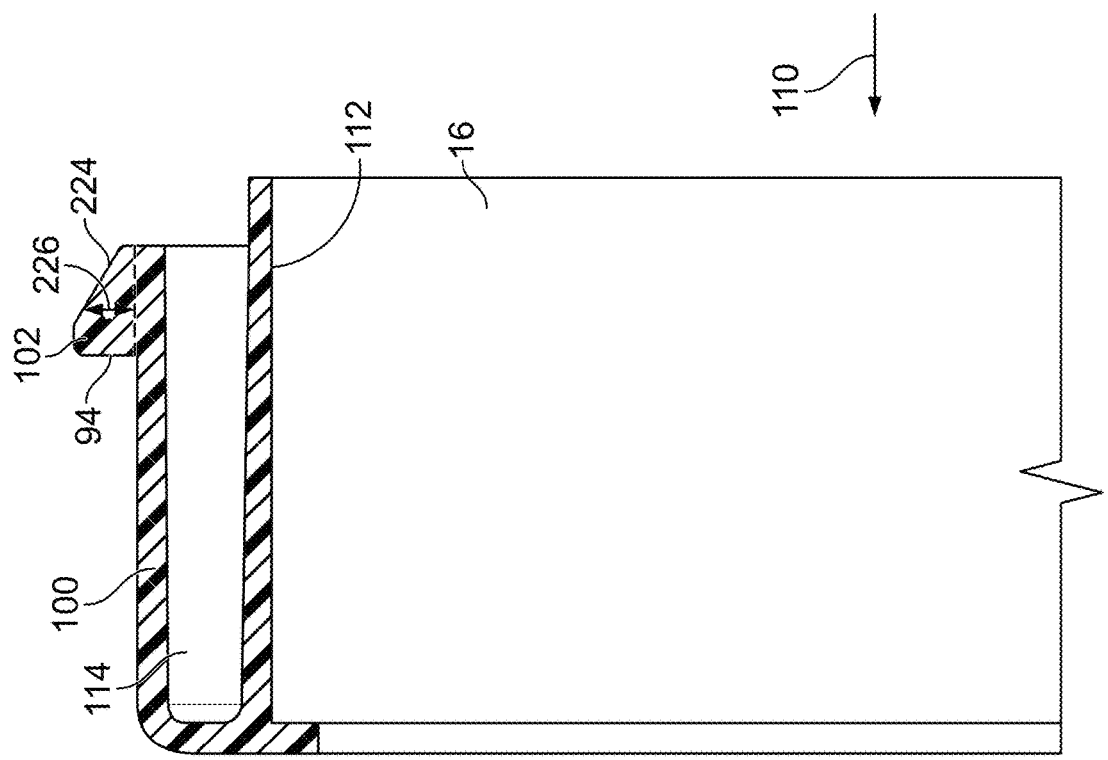
FIG. 6 is a cross-sectional view taken across line 6-6 showing a barb of the rotor which forms a portion of the snap-fit connection.
Figure 9:
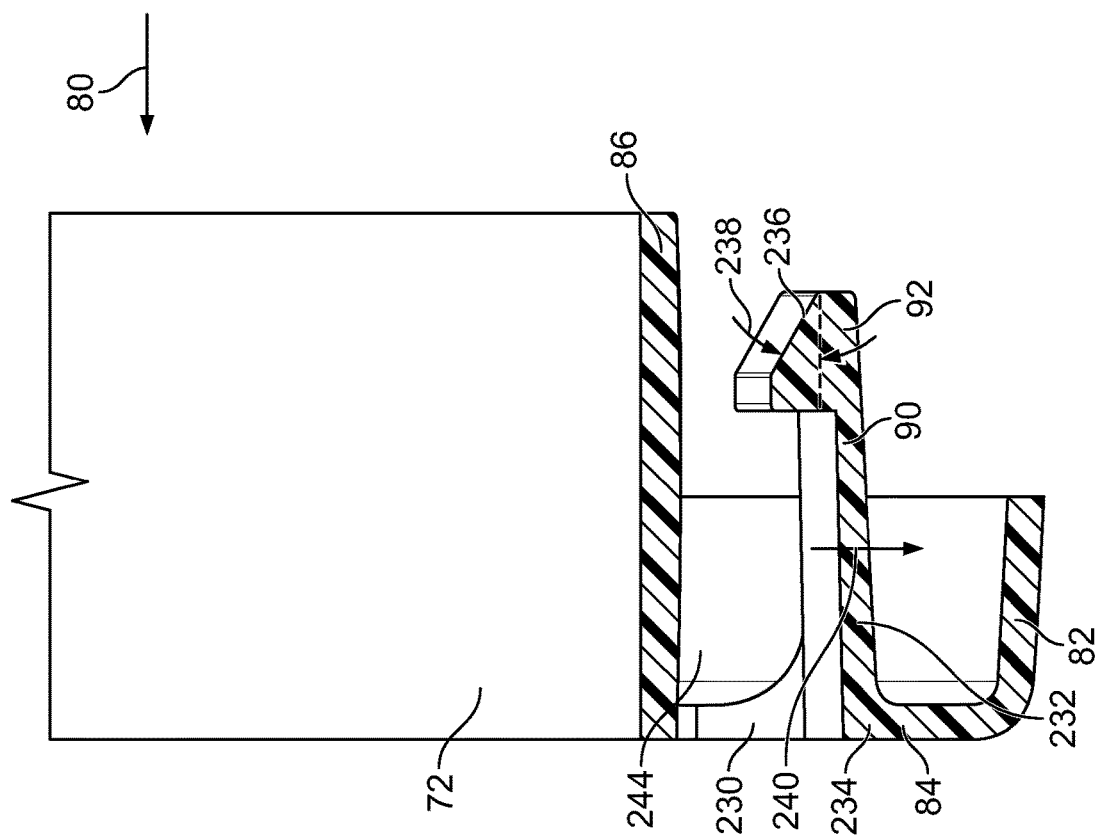
FIG. 9 is a cross-sectional view taken across line 9-9 in FIG. 8 showing a barb of the insert which forms another portion of the snap-fit connection.
Figure 11:
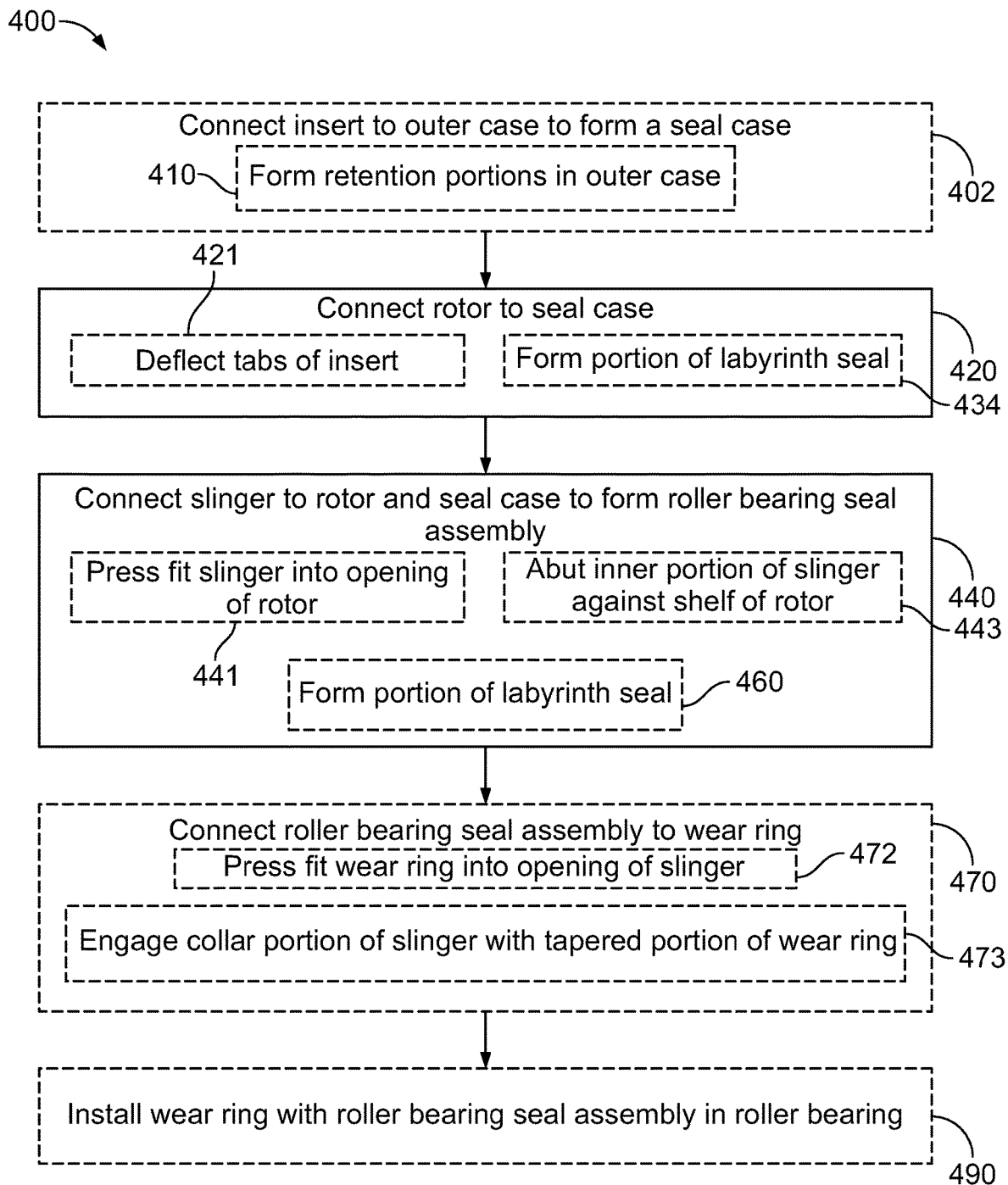
FIG. 11 is a flowchart of a method of assembling a roller bearing seal assembly.

Regarding FIG. 6, the rotor 16 includes an inner portion, such as the inner ring 112. The outer ring 100 and inner ring 112 define therebetween an annular channel 114. The inner ring 86 of the insert 72 extends at least partially into the annular channel 114 of the rotor 16 as shown in FIG. 2 when the rotor 16 is assembled with the seal case 14. Referring to FIG. 9, the insert 72 includes a gap 244 defined between the tabs 90 and the inner ring 86. The outer ring 100 of the rotor 16 extends into the gap 244 of the insert 72 when the rotor 16 is assembled with the seal case 14.

With reference to FIG. 2, the slinger 120 is connected to the rotor 16 and which rotates with the rotor 16 as the journal 32 rotates about the axis 34. The slinger 120 includes an outer portion, such as an outer ring 122, an intermediate portion such as an intermediate wall 124, and an inner portion, such as inner ring 126.

The roller bearing seal assembly 12 forms a labyrinth seal 140 that limits egress of lubricant from the roller bearing 12 and limits ingress of water, debris, and dirt into the roller bearing 10. In one embodiment, the roller bearing seal assembly 12 forms a noncontact seal wherein there is no direct physical contact between the nonrotating and rotating parts or between parts rotating at different speeds. In another form, the roller bearing seal assembly 12 may form a contact seal and include a resilient member at position 130 mounted to the one of the slinger 120 and the outer case 70 and which contacts the other of the slinger 120 and the outer case 70 as the slinger 120 rotates with turning of the journal 32. In one form, the labyrinth seal 140 includes a tortuous pathway 142 defined between the outer case 70, the insert 72, the rotor 16, and the slinger 120. The insert 72 and the rotor 16 define a first portion 146 of the tortuous pathway 142 therebetween and the outer case 70 and the slinger 120 form a second portion 148 of the tortuous pathway 142. The slinger 120 may include raised portions 150 along the tortuous pathway 142. The raised portions 150 operate as a bumper against the outer case 70. If the slinger 120 contacts the outer case 70 while the slinger 120 is rotating, each pair of raised portions 150 forms line contacts with the outer case 70. The line contacts create less friction with the outer case 70 and produce less heat than if a single large annular surface of the slinger 120 was contacting the outer case 70. The raised portions 150 also inhibit flow of lubricant, water, debris, or dirt through the tortuous pathway 142.

With reference to FIG. 2, the inner ring 126 of the slinger 120 includes a radially inner surface 154 that engages a radially outer surface 156 of the wear ring 44. The inner ring 126 includes a collar portion 160 that tapers radially inward as the collar 160 extends in direction 110. The collar portion 160 may extend at an angle 162 relative to a portion 164 of the inner ring 126 that extends parallel to the axis 34. The collar 60 forms an undercut that engages a tapered portion 170 of the wear ring 44. The engagement between the collar portion 160 and the tapered portion 170 resists movement of the slinger 120 in direction 80. This is advantageous because limiting movement of the slinger 120 in direction 80 limits potential changes in the dimensions of the labyrinth seal 140 and maintains the efficacy of the labyrinth seal 140.

With reference to FIGS. 3-5 and 8, the roller bearing seal assembly 12 has a central opening 200. The rotor 16 has a central axis 201 and an opening 202, the insert 72 has a central axis 203 and an opening 204, the outer case 70 has an opening 206, and the slinger 120 has an opening 208. The central axes 201, 203 extend out of the page in FIGS. 5 and 8 and are coaxial with the axis of rotation 34 when the roller bearing 10 receives the journal 32. The rotor 16 will now be discussed in greater detail with reference to FIGS. 5-7.

Figure 8:
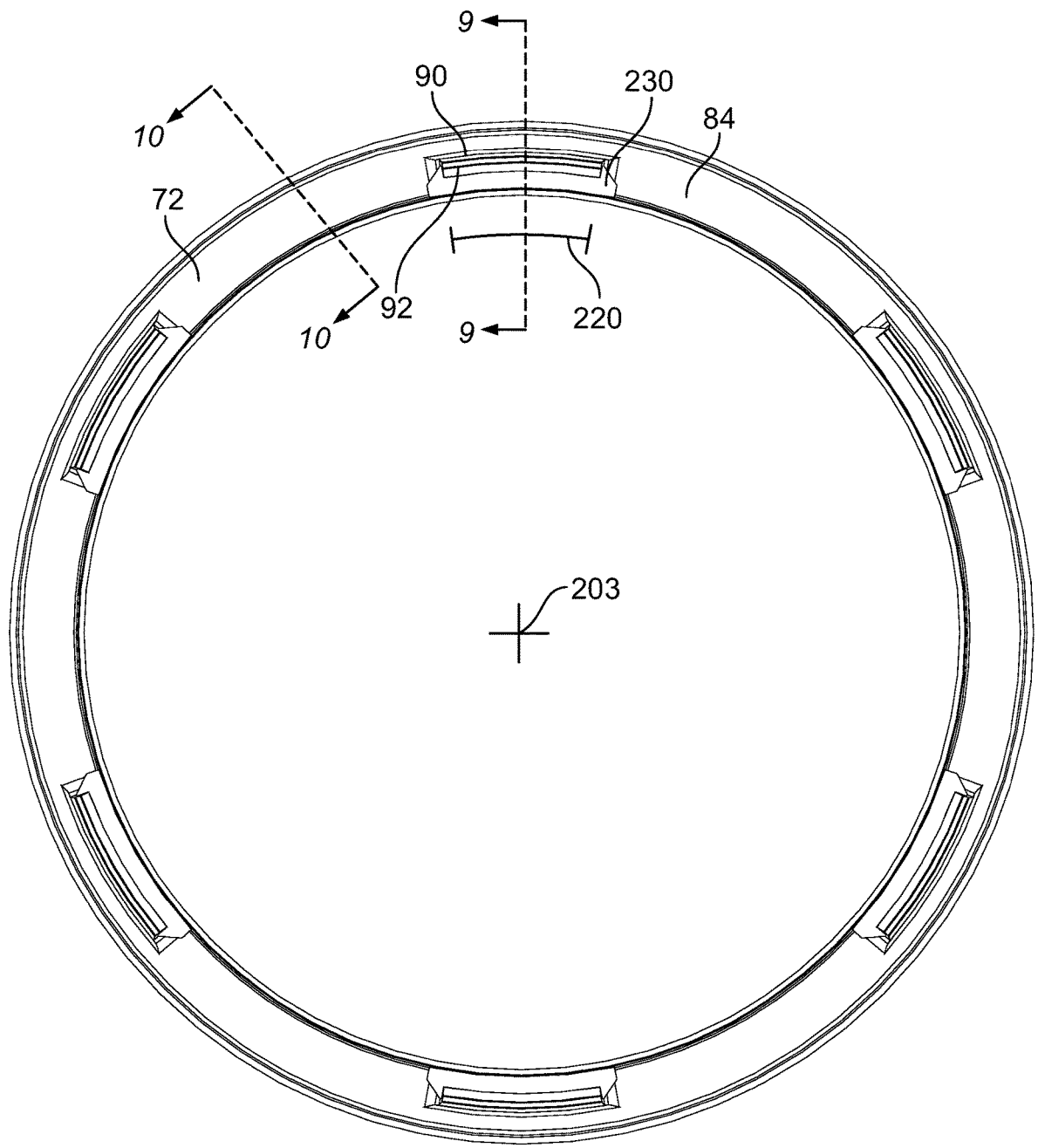
FIG. 8 is a plan view of the insert of FIG. 3 showing tabs of the insert spaced circumferentially about the insert.

The rotor 16 has an annular shape extending about the axis 201. The rotor 16 includes the barbs 102 spaced circumferentially about the rotor 16 and separated by gaps 210. The barbs 102 may have a width 212 in the circumferential direction that is less than a distance 214 between the barbs 102. Referring temporarily to FIG. 8, the insert 72 has one or more tabs 90, such as six tabs 90, spaced circumferentially about the insert 72. Each tab 90 includes one of the barbs 92. Each barb 92 may have a width 220 in the circumferential direction about the insert 72 that is larger than the width 212 of each of the barbs 102 of the rotor 16. When the rotor 16 is being advanced in direction 80 into the seal case 14 (see FIGS. 13-15), the wider barbs 92 engage and snap past one or more of the barbs 102 regardless of the rotary position of the insert 72 relative to the rotor 16. The wider barbs 92 ensure a camming engagement with the barbs 102 regardless of the rotary position of the rotor 16 relative to the insert 72. As discussed in greater detail below, the camming engagement between the barbs 92, 102 deflects the tabs 90 and permits the barbs 92 to snap past the barbs 102 of the rotor 16.

Figure 7:
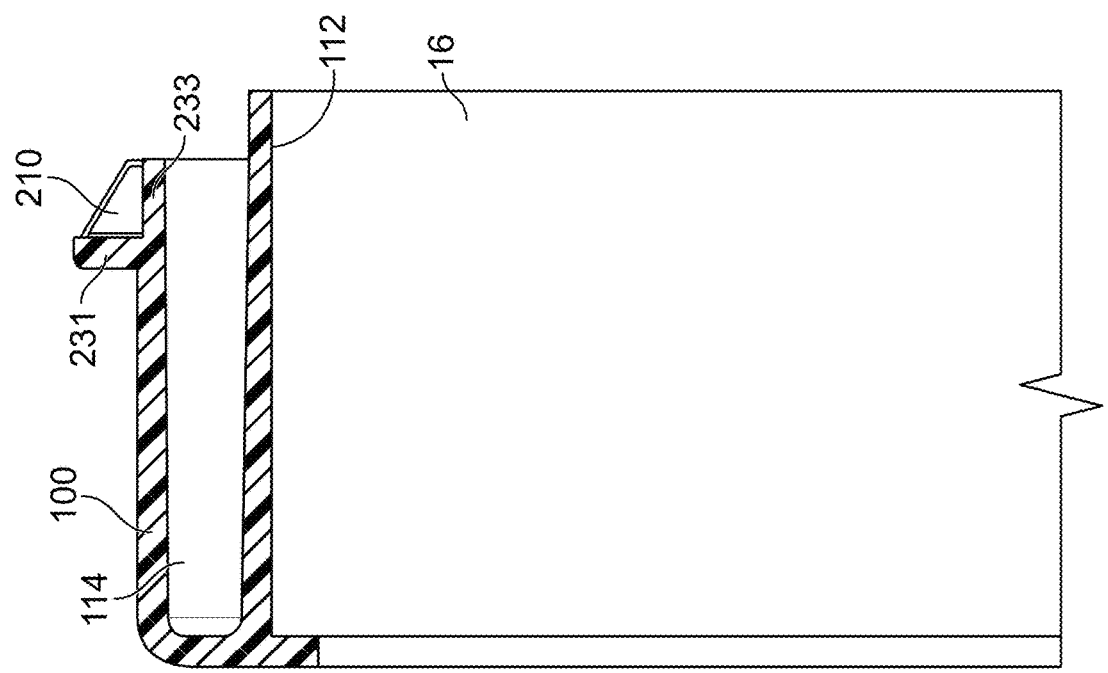
FIG. 7 is a cross-sectional view taken across line 7-7 in FIG. 5 showing an outer ring of the rotor intermediate the barbs of the rotor.

Regarding FIG. 6, each barb 102 of the rotor 16 includes a cam surface such as surface 224 that extends transversely to an axis parallel to the axis 201, such as at an angle 226. The angle 226 may be in the range of approximately 5 degrees to approximately 85 degrees, such as 30 degrees. With reference to FIG. 7, in the sections of the outer ring 100 between the barbs 102, the outer ring 100 includes a radially extending wall 231 and an axially extending wall 233. The radially extending wall 231 and axially extending wall 233 provide a more uniform wall thickness throughout the rotor 16 than if the rotor 16 had a single, continuous barb 102 throughout. The uniform wall thickness may improve the flow of plastic material into a mold for forming the rotor 16 which may be desirable in some applications. As a further example, the rotor 16 may include a single, continuous barb 102 having an angle 226 of approximately five degrees. The rotor 16 would have a substantially uniform thickness throughout due to the shallow angle 226.

Figure 10:
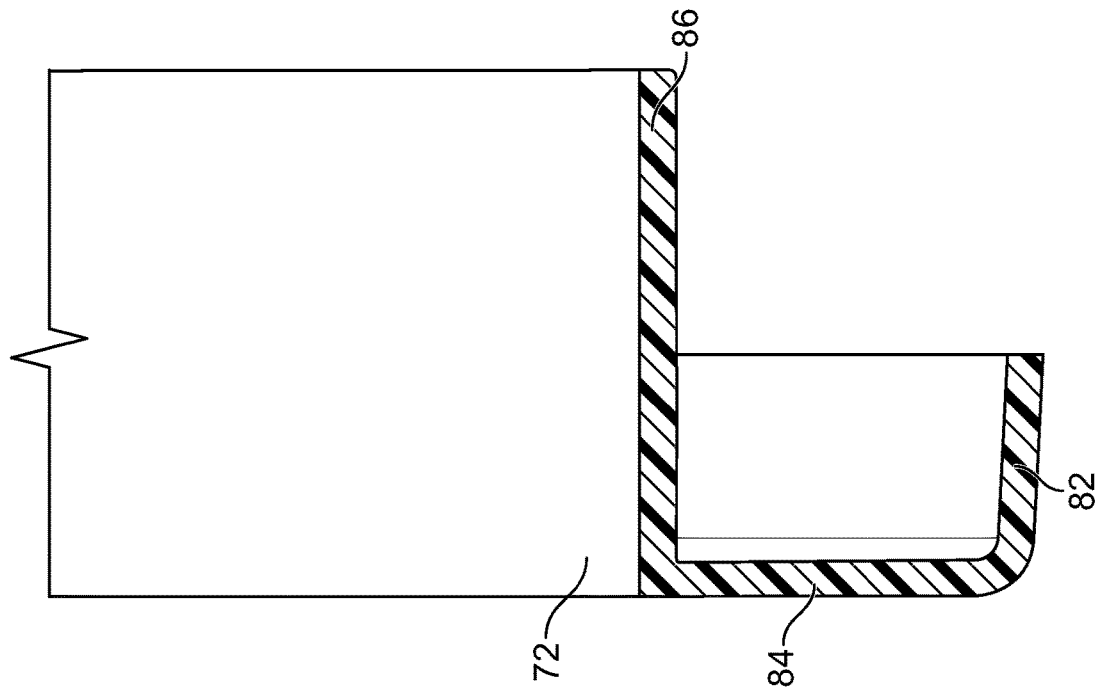
FIG. 10 is a cross-sectional view taken across line 10-10 in FIG. 8 showing an intermediate annular wall of the insert between the tabs of the insert.

With reference to FIG. 8, the insert 72 includes one or more openings 230 at the tabs 90 that increase the resiliency of the insert 72 to permit flexing of the tabs 90. In one embodiment, the openings 230 are radially aligned with the tabs 90. With reference to FIG. 9, each tab 90 includes a body portion 232 and a base portion 234 connecting the body portion 232 to the intermediate wall 84 of the insert 72. The body portion 232 is upstanding from the intermediate wall 84 and extends to the barb 92. The barb 92 includes a cam surface, such as surface 236, which extends transversely to an axis parallel to the axis 201 such as at an angle 238. The angle 238 may be in the range of approximately 5 degrees to approximately 85 degrees, such as 30 degrees. As discussed in greater detail below, the camming engagement between the surface 236 of the insert barb 92 and the surface 224 of the rotor barb 102 (see FIG. 6) urges the barb 92 generally radially outward and flexes the body portion 232 of the tab 90 in direction 240. Due to the presence of the opening 230 at the tab base portion 234, the intermediate wall 84 has a reduced amount of material near the tab base portion 234 to resist the flexing of the tab 90 which increases the flexibility of the tab 90. The openings 230 also provide clearance for components of a mold used to form the insert 72. With reference to FIG. 10, the intermediate wall 84 of the insert 72 has sections between the tabs 90 that are not interrupted by the openings 230 at circumferential positions intermediate the tabs 90. The intermediate wall 84 thereby provides enhanced rigidity for the insert 72 at the sections intermediate the tabs 90. The components of the seal assembly 12 may be made from a variety of materials such as metallic and plastic materials. As one example, the rotor 16, insert 72, and outer case 70 may be made of fiberglass reinforced polyester and the slinger 120 may be made of an acetal polymer. The rotor 16, insert 72, outer case 70, and slinger 120 may be made using injection molding and/or additive manufacturing. The outer case 70 may be alternatively be made using stamping or roll forming.

Figure 12:
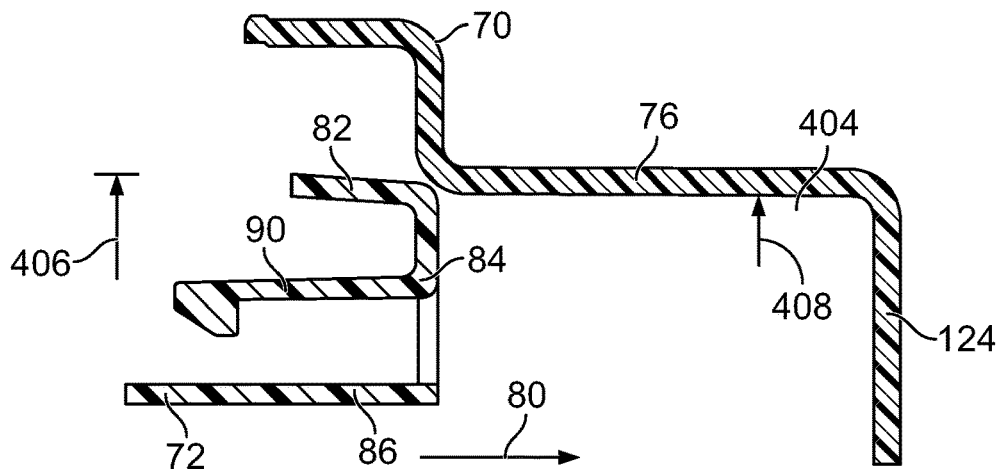
FIG. 12 is a cross-sectional view of the insert being connected to the outer case to form a seal case of the seal assembly.

With reference to FIGS. 11-17, a method 400 is provided for assembling the roller bearing seal assembly 12. The method 400 includes connecting 402 the insert 72 to the outer case 70 to form the seal case 14. With reference to FIG. 12, the outer case 70 has a generally annular compartment 404 and the insert 72 is advanced in direction 80 into the compartment 404. In one embodiment, the outer ring 82 of the insert 72 has an outer diameter 406 that is larger than an inner diameter 408 of the intermediate portion 76 of the outer case 70. The connecting 402 includes press-fitting the insert 72 into the compartment 404 which fixes the insert 72 to the outer case 70.

Figure 13:
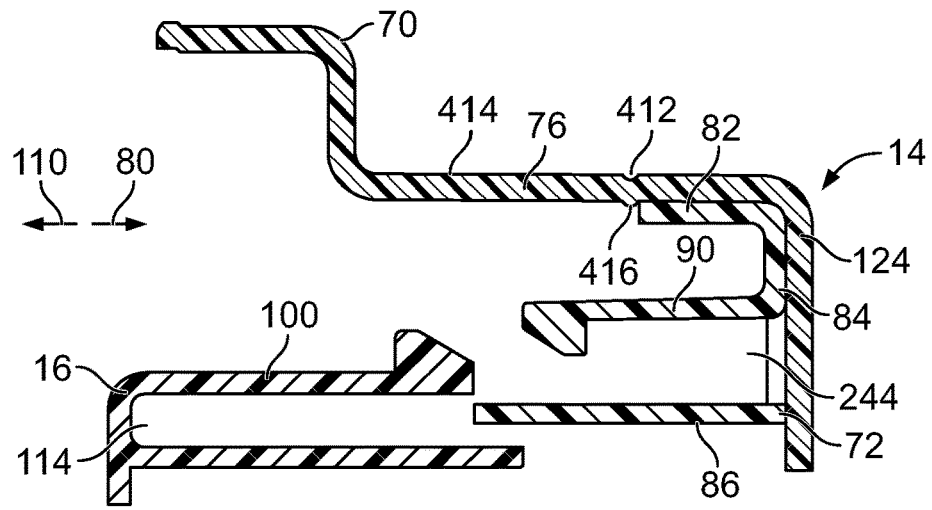
FIG. 13 is a cross-sectional view similar to FIG. 12 showing an outer ring of the rotor aligned with a gap of the insert.

With reference to FIG. 13, the connecting 402 may include forming 410 one or more retention portions in the outer case 70. For example, one or more pins may be used to form dimples 412 in a radially outer surface 414 of the intermediate portion 76. This operation deforms the material of the intermediate portion 76 radially inward producing a retention member, such as one or more nubs 416. The nubs 416 resist movement of the outer ring 82 of the insert 72 in direction 110. The insert 72 is thereby securely engaged within the outer case 70 by way of the press-fit engagement as well as the nubs 416.

Figure 14:
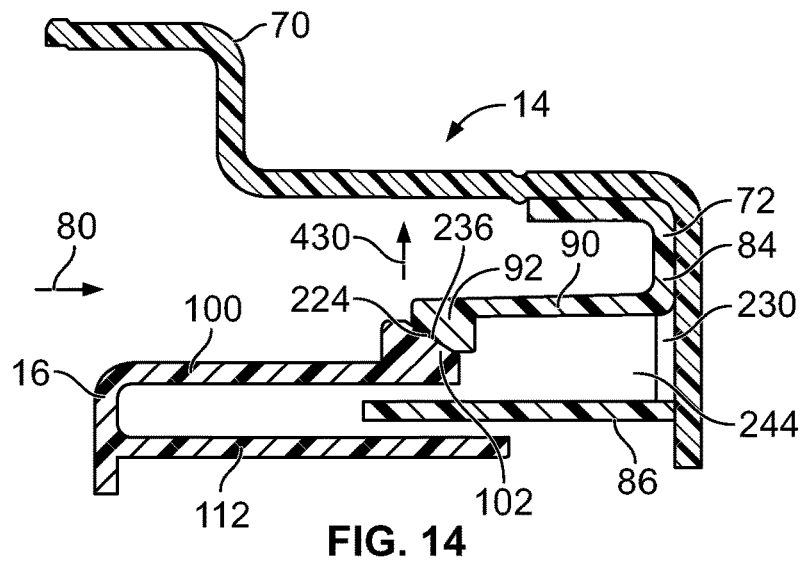
FIG. 14 is a cross-sectional view similar to FIG. 13 showing the outer ring of the rotor being advanced into the gap of the insert.

The method 400 includes connecting 420 the rotor 16 to the seal case 14. The connecting 420 includes aligning the outer ring 100 of the rotor 16 with the gap 244 of the insert 72 as shown in FIG. 13. The rotor 16 is advanced in a direction 80 which brings the surfaces 224, 236 of the barbs 92, 102 into engagement as shown in FIG. 14. The outer ring 100 is more rigid than the tabs 90 so that the tabs 90 deflect 421 as the rotor 16 is advanced farther in direction 80. The outer ring 100 may be more rigid than the tabs 90 by way of the material and/or shape of the rotor 16. For example, the outer ring 100 has a continuous, annular shape which resists deflection whereas the segmented configuration of the tabs 90 about the insert 72 and the openings 230 of the insert 72 reduce the resistance of the insert 72 to deflection of the tabs 90.

Figure 15:
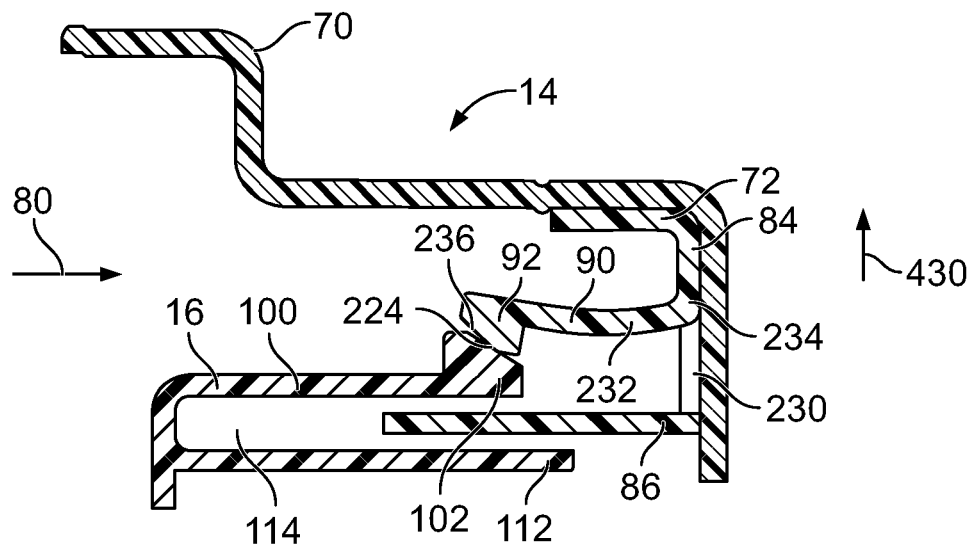
FIG. 15 is a cross-sectional view similar to FIG. 14 showing the barb of the rotor camming a barb of a tab of the insert and causing deflection of the tab of the insert.

With reference to FIG. 15, continued advancing of the rotor 16 in direction 80 and the camming engagement between the surfaces 224, 236 urges the barb 92 generally radially outward in direction 430 and flexes the tab body portion 232 and the tab base portion 234. The flexing of the tab base portion 234 permits the tab body portion 232 to pivot radially outward. Once the barbs 102 of the rotor 16 have been advanced axially in direction 80 beyond the barbs 92 of the tabs 90, the barbs 92 snap radially inward behind the barbs 102 such that the overlapping barbs 92, 102 resist separation of the rotor 16 and the insert 72. The tab body portion 232 and the tab base portion 234 bias the barbs 92 radially inward once the barbs 102 of the rotor 16 have been advanced beyond the barbs 92 of the insert 72. The connecting 420 operation includes forming 434 the first portion 146 of the tortuous pathway 142 upon assembly of the rotor 16 and insert 72.

Figure 16:
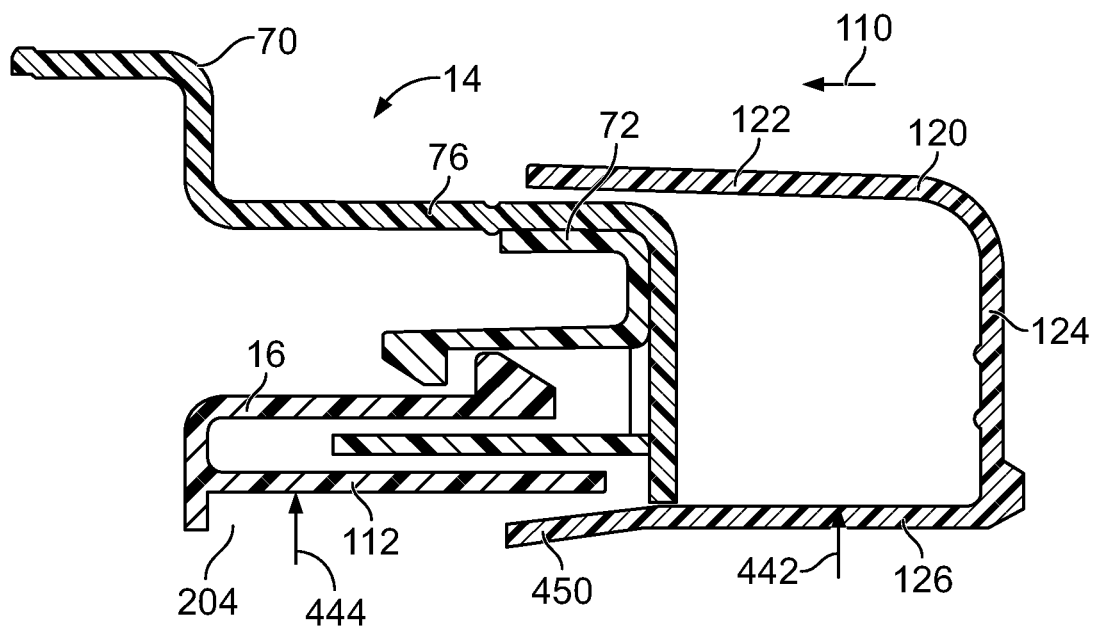
FIG. 16 is a view similar to FIG. 15 showing the barb of the rotor having traveled past the barb of the insert to form the snap-fit connection and further showing a slinger being connected to the rotor.

With reference to FIG. 16, the method 400 includes connecting 440 the slinger 120 to the rotor 16 and seal case 14 to form the roller bearing assembly 12. In one embodiment, the connecting 440 includes press-fitting 441 the inner ring 126 of the slinger 120 in direction 110 into the opening 204 of the rotor 16. The inner ring 126 of the slinger 120 has an outer diameter 442 that is greater than an inner diameter 444 of the inner ring 112.

Figure 17:
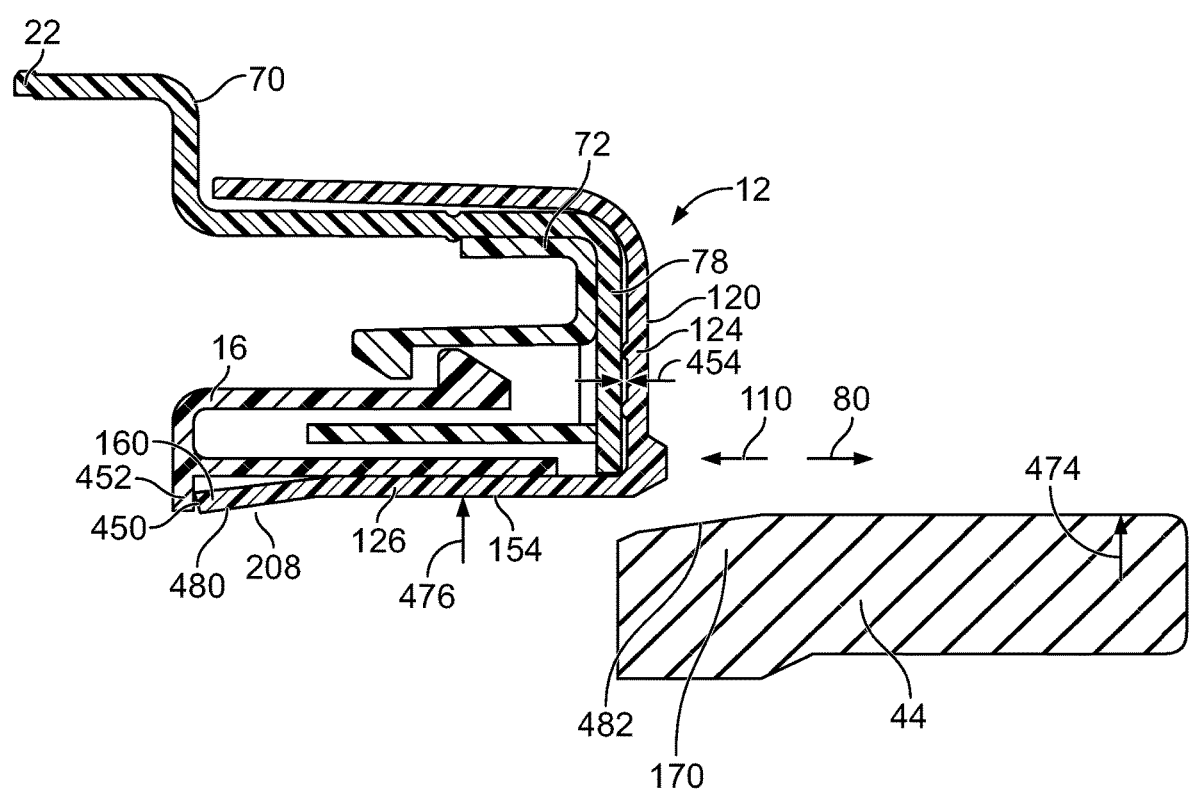
FIG. 17 is a cross-sectional view similar to FIG. 16 showing a wear ring of the roller bearing assembly being connected to the roller bearing seal assembly.

With reference to FIG. 17, the connecting 440 may include abutting 443 an inner portion of the slinger 120, such as an end portion 450 of the slinger inner ring 126, against a shelf 452 of the rotor 16. The abutting contact between the slinger end portion 450 and the shelf 452 resists shifting of the slinger 120 in direction 110 as the wear ring 44 is connected to the slinger 120 or roller bearing seal assembly 12. This preserves an axial distance 454 between the intermediate wall 124 of the slinger 120 and the inner portion 78 of the outer case 70 and preserves the dimensions of the labyrinth seal 140 during assembly of the wear ring 44 to the roller bearing seal assembly 12. The connecting 440 operation may also include forming 460 the second portion 148 of the tortuous pathway 142 upon connection of the slinger 120 to the rotor 16.

The method 400 may further include connecting 470 the roller bearing seal assembly 12 to the wear ring 44 as shown in FIG. 17. In one embodiment, the wear ring 44 has a radially outer diameter 474 that is larger than a radially inner diameter 476 of the inner ring 126 of the slinger 120 of the roller bearing seal assembly 12. The connecting 470 operation may include press-fitting 472 the wear ring 44 in direction 110 into the opening 208 of the slinger 120 until the wear ring 44 is at a predetermined axial position along the inner ring 126 of the slinger 120.

Advancing of the wear ring 44 in direction 110 into the opening 208 engages 473 the tapered portion 170 of the wear ring 44 with the collar portion 160 of the inner ring 126 of the slinger 120. More particularly, the collar portion 160 includes a portion 480 of the radially inner surface 154 of the slinger inner ring 126 that engages a tapered outer surface 482 of the wear ring 44. The engagement between the slinger portion 480 and the wear ring tapered outer surface 482 resists shifting of the slinger 120 in direction 80 during operation of the roller bearing seal assembly 12 and preserves the geometry of the labyrinth seal 140.

The method 400 may further include installing 490 the wear ring 44 with the roller bearing assembly 12 connected thereto in the roller bearing 10. The installing 490 may include engaging the bead 22 of the outer case 70 with the groove 24 of the bearing cup 20.

The roller bearing 10 discussed above may be a different type of roller bearing than the tapered roller bearing having two rows of bearing as is shown in FIG. 1. For example, the roller bearing 10 may have a single row of tapered roller bearings, four rows of tapered roller bearings, cylindrical roller bearings, and/or ball bearings. In these alternative embodiments, the seal case 14, the rotor 16, and the slinger 120 may be configured as required for the particular application. As another example, the tapering direction of the inboard and outboard roller tapered rollers 36 may be inverted from what is depicted in FIG. 1. Further, although operation of the bearing 10 typically involves the journal 32 rotating relative to the bearing cup 20, the bearing cup 20 may rotate about a stationary journal 32 or the bearing cup 20 and journal 32 may rotate at different speeds. The roller bearing 10 may be used with the journals of railcars, journals of railway locomotives, and journals of passenger trains.

With reference to FIG. 18, a seal assembly 500 is provided that is similar in many respects to the seal assembly 12 discussed above such that differences between the two will be highlighted. The seal assembly 500 includes an outer case 502, a slinger 504, an insert 506, and a rotor 508. The insert 506 includes an outer ring 510 secured to the outer case 502, such as by press fitting the insert 506 into the outer case 502. The insert 506 includes an intermediate wall 512 and an inner ring 514. The seal assembly 500 includes a snap-fit connection 511 that connects the rotor 508 to the insert 506 and resists separation of the rotor 508 from the insert 506 prior to mounting the slinger 504 to the rotor 508. The rotor 508 includes an inner ring 520, an intermediate wall 522, and a snap-fit member, such as an outer ring 524. The insert 506 includes a snap-fit member, such as a tab 526, that engages a flange 528 of the outer ring 524 of the rotor 508. The tab 526 and the flange 528 include stop surfaces 530, 532 that abut and resist movement of the rotor 508 in direction 534. The slinger 504 is fixed to the rotor 508, such as by press fitting an inner ring 540 of the slinger 504 into the inner ring 520 of the rotor 508. The rotor 508 and slinger 504 turn with the associated journal relative to the outer case 502 and the insert 506.

With reference to FIG. 19, a seal assembly 600 is provided that is similar in many respects to the seal assemblies 12, 500 discussed above. The seal assembly 600 includes an outer case 602, a slinger 604, an insert 606, and a rotor 608. The insert 606 includes an outer ring 610 fixed to an intermediate portion 612 of the outer case 602. The insert 606 further includes an intermediate ring 614 and the rotor 608 includes an outer ring 616. The seal assembly 600 includes a snap-fit connection 620 formed by the insert 606 and the rotor 608. The snap-fit connection 620 resists separation of the rotor 608 from the insert 606 in direction 622. The snap-fit connection 620 includes a snap-fit member of the rotor 608, such as one or more tabs 626 and a snap-fit member of the insert 606, such as an inner ring 624. The inner ring 624 includes one or more barbs 628 and the tabs 626 include barbs 630. The barbs 628, 630 include surfaces 640, 642 configured to abut and resist movement of the rotor 608 in direction 622 beyond a predetermined position relative to the insert 606.

Figure 20:
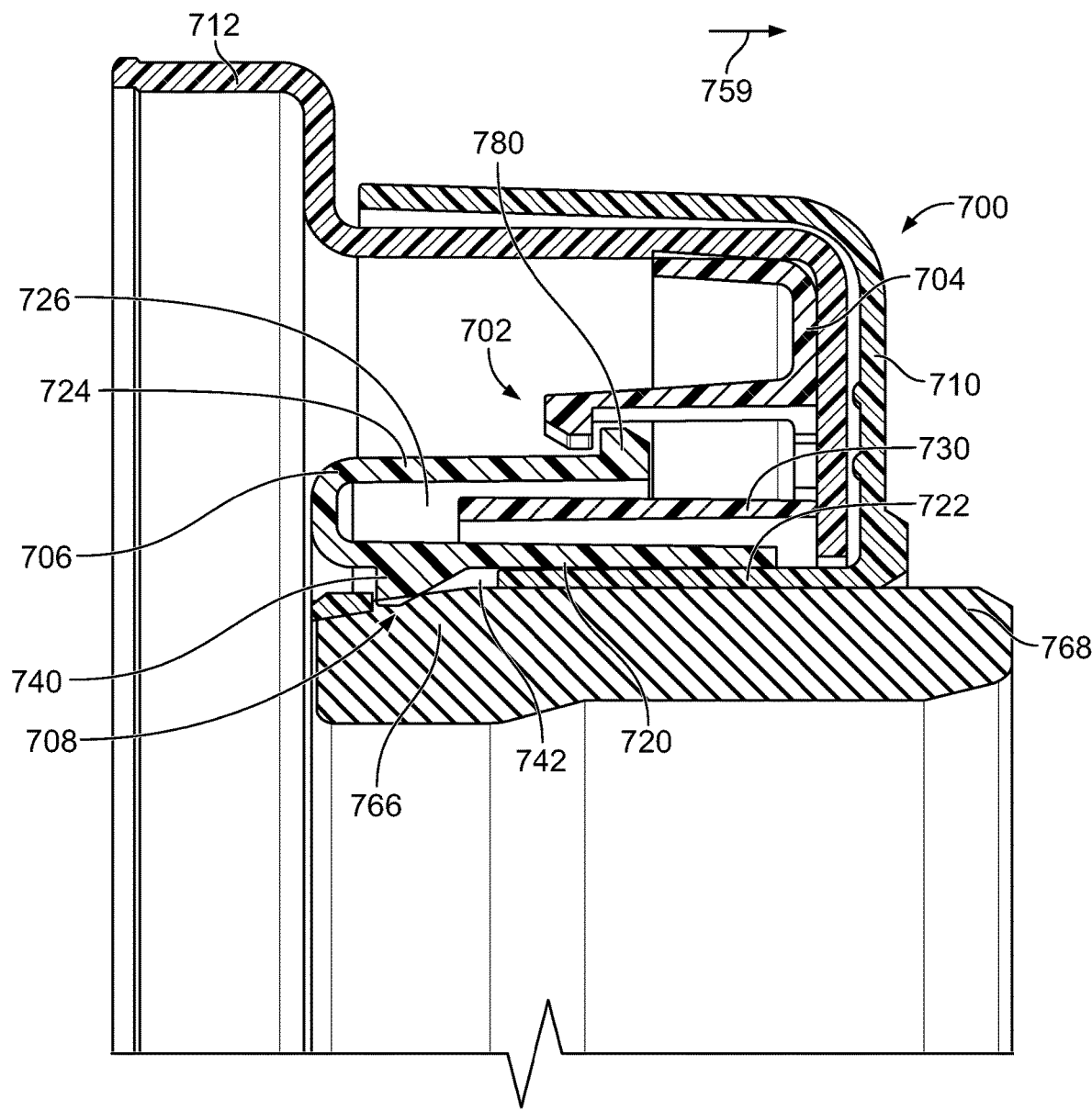
FIG. 20 is a cross-sectional view of another roller bearing seal assembly and a wear ring showing a first snap-fit connection between an insert and a rotor of the roller bearing seal assembly and a second snap-fit connection between the rotor and a slinger of the roller bearing seal assembly.

With reference to FIG. 20, a seal assembly 700 is provided that is similar in many respects to the seal assembly 12 discussed above and may be assembled using a method similar to the method 400 discussed above. The seal assembly 700 includes a first snap-fit connection 702 between an insert 704 and a rotor 706 of the seal assembly 700 and a second snap-fit connection 708 between the rotor 706 and a slinger 710 of the seal assembly 700. The seal assembly 700 includes an outer case 712 to which the insert 704 is secured. The insert 704 and the outer case 712 are similar in many respects to the insert 72 and the outer case 70 discussed above.

The snap-fit connection 708 includes a snap-fit member of the rotor 706, such as an inner ring 720, and a snap-fit member of the slinger 710, such as an inner ring 722. Regarding FIG. 25, the rotor 706 includes an outer ring 724 that defines an annular channel 726 between the outer ring 724 and the inner ring 720. The insert 704 includes an inner ring 730 (see FIG. 20) that is received in the annular channel 726 of the rotor 706. The inner ring 720 includes one or more barbs 740 that snap into one or more openings 742 of the inner ring 722 of the slinger 710. Thus, the seal assembly 700 may be assembled in a manner similar to the method 400 discussed above with the operation of connecting 440 of the slinger 710 to the rotor 706 including engaging the barbs 740 of the rotor 706 with the openings 742 of the slinger 710.

Figure 22:
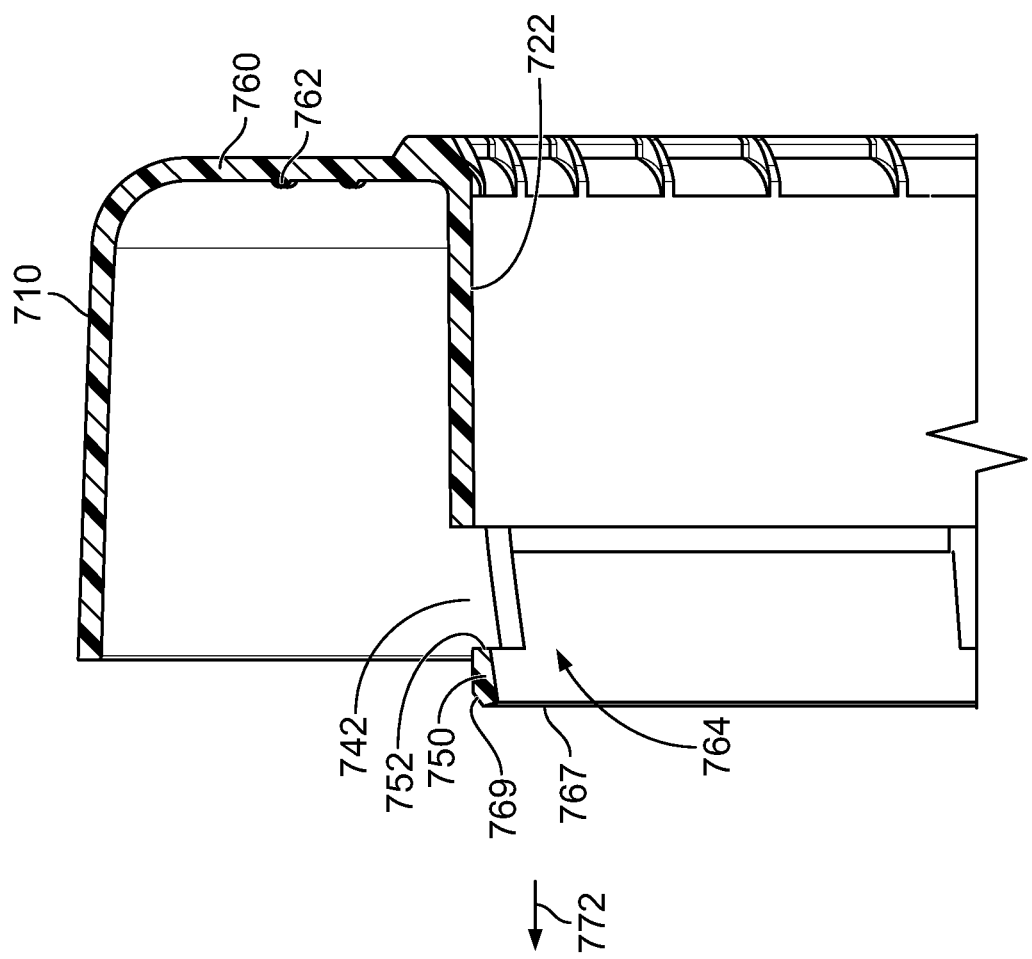
FIG. 22 is a cross-sectional view taken across line 22-22 in FIG. 21 showing a through opening extending radially through an inner ring of the slinger.
Figure 25:
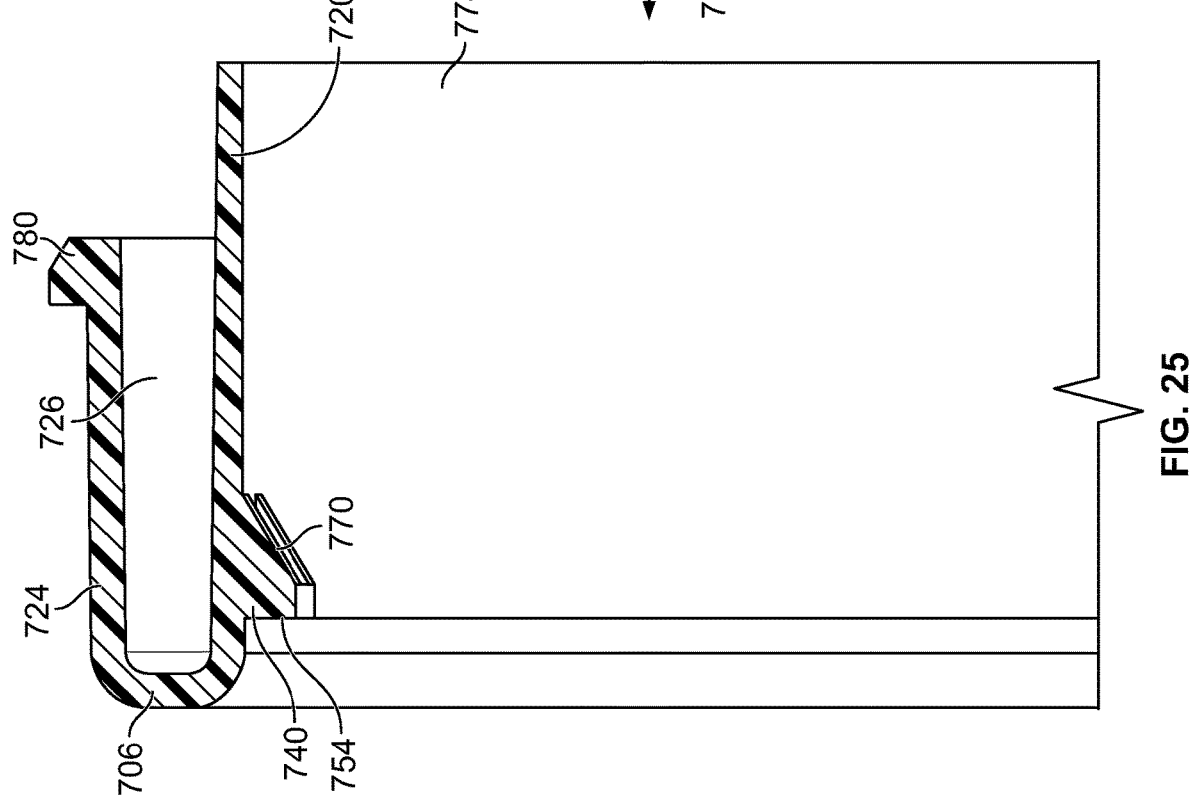
FIG. 25 is a cross-sectional view taken across line 25-25 in FIG. 24 showing the radially inner barbs of the inner ring of the rotor.

With reference to FIGS. 20, 22, and 25, the slinger inner ring 722 includes engagement members 750 each having a stop surface 752 and the rotor barbs 740 each include a stop surface 754 that abuts the stop surface 752 of the slinger 710 and resist movement of the slinger 710 in direction 759. In this manner, the second snap-fit connection 708 permits the slinger 710 to be assembled with the outer case 712, insert 704, and rotor 706 and transported to a facility without the assembly falling apart. This makes the assembly of the outer case 712, insert 704, rotor 706, and inner ring 722 easier to handle. The second snap-fit connection 708 also permits the rotor 706 and slinger 710 to be securely connected together without press fitting the slinger 710 into the rotor 706.

Figure 21:
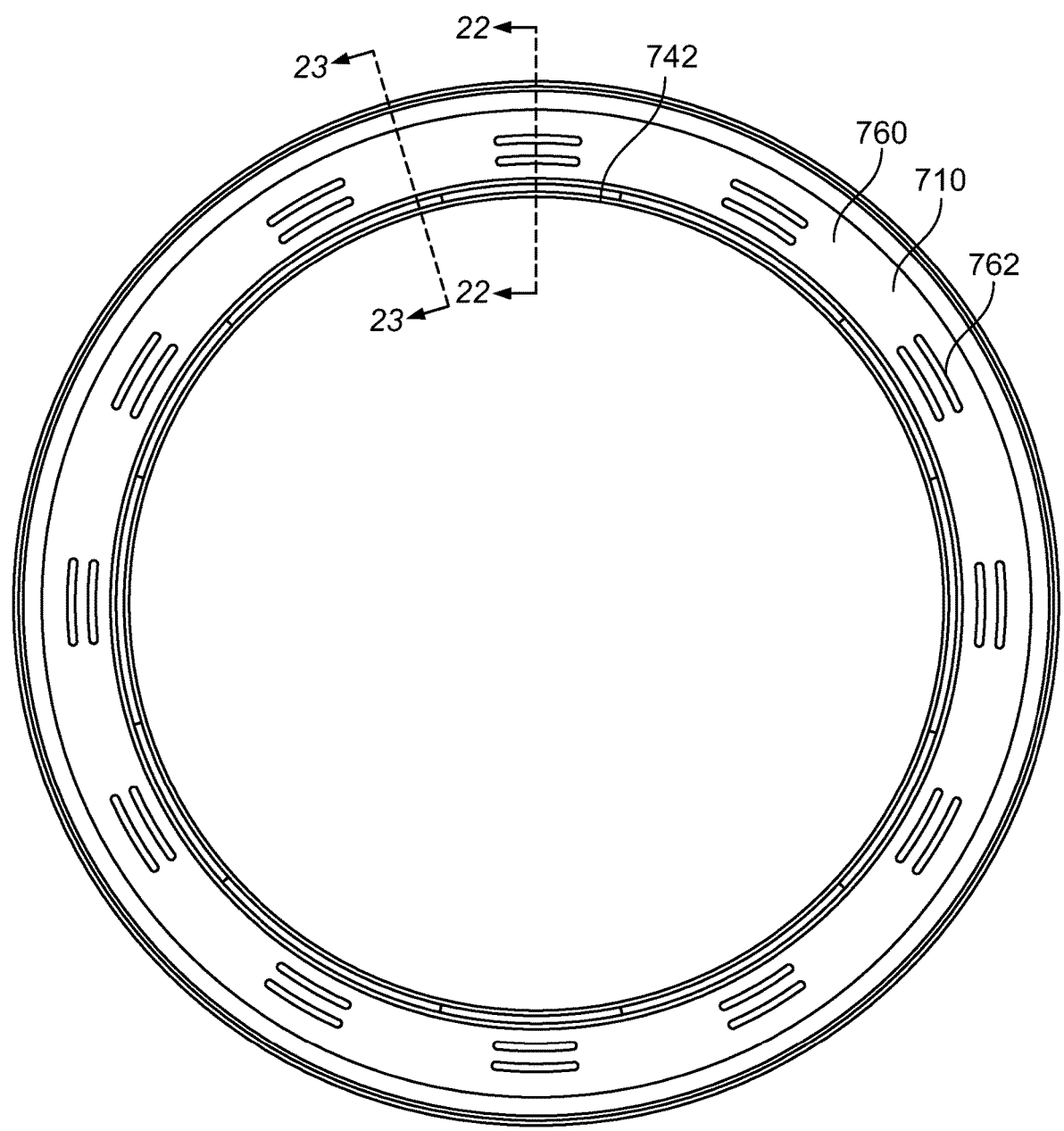
FIG. 21 is a plan view of the slinger of FIG. 20.
Figure 23:
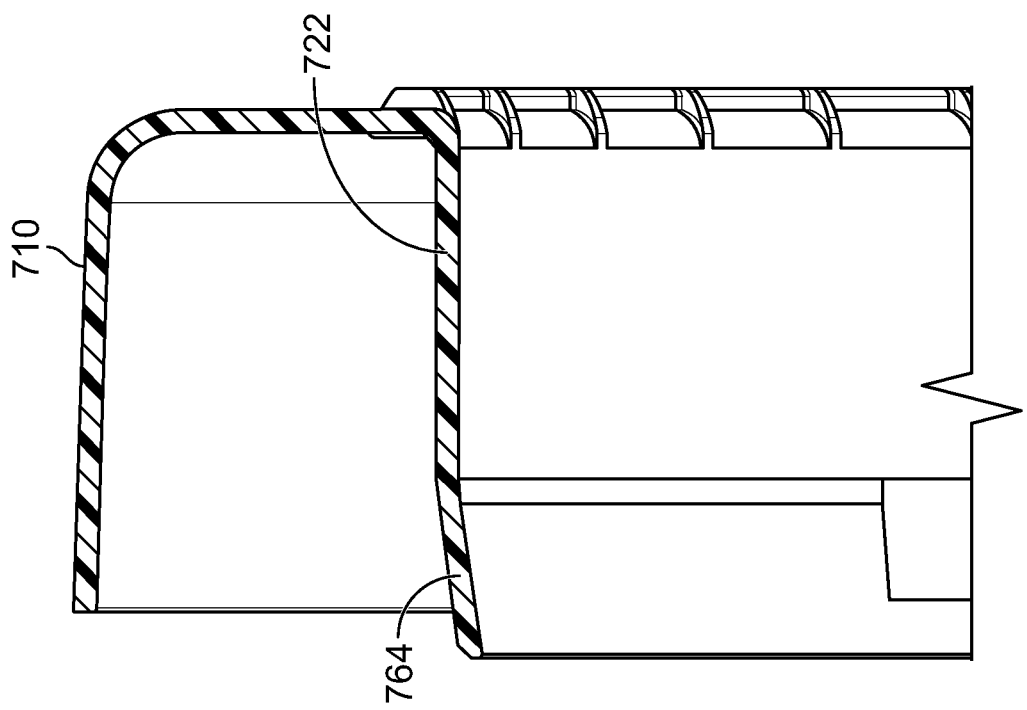
FIG. 23 is a cross-sectional view taken across line 23-23 in FIG. 21 showing an uninterrupted portion of the inner ring of the slinger.

With reference to FIG. 21, the slinger 710 includes an intermediate wall 760 with one or more raised portions 762 that are similar to the raised portions 150 discussed above. With reference to FIGS. 22 and 23, the inner ring 722 includes a collar 764 that engages a tapered portion 766 of a wear ring 768 (see FIG. 20). The collar 764 includes the one or more openings 742 that receive the one or more barbs 740 of the rotor 706. The collar 764 includes a free end 767 and a tapered surface 769. The tapered surface 769 cammingly engages a tapered surface 770 (see FIG. 25) of the barbs 740 of the rotor 706 as the slinger 710 is advanced in direction 772 into an opening 774 of the rotor inner ring 720. The camming engagement between the surfaces 769, 770 deflects the collar 764 of the slinger 710 radially inward so that the collar 764 may travel over the barbs 740 until the openings 742 align with the barbs 740. Once the openings 742 align with the barbs 740, the inner ring 722 urges the collar 764 radially inward such that the engagement members 750 snap behind (to the left of in FIG. 20) of the barbs 740. This creates a positive lock between the slinger 710 and the rotor 706 against relative movement therebetween. With reference to FIG. 23, the collar 764 may have uninterrupted portions circumferentially between the openings 742. The uninterrupted portions of the collar 764 resist radial expansion and contraction of the collar 764 which keeps the engagement members 750 engaged behind the barbs 740.

Figure 24:
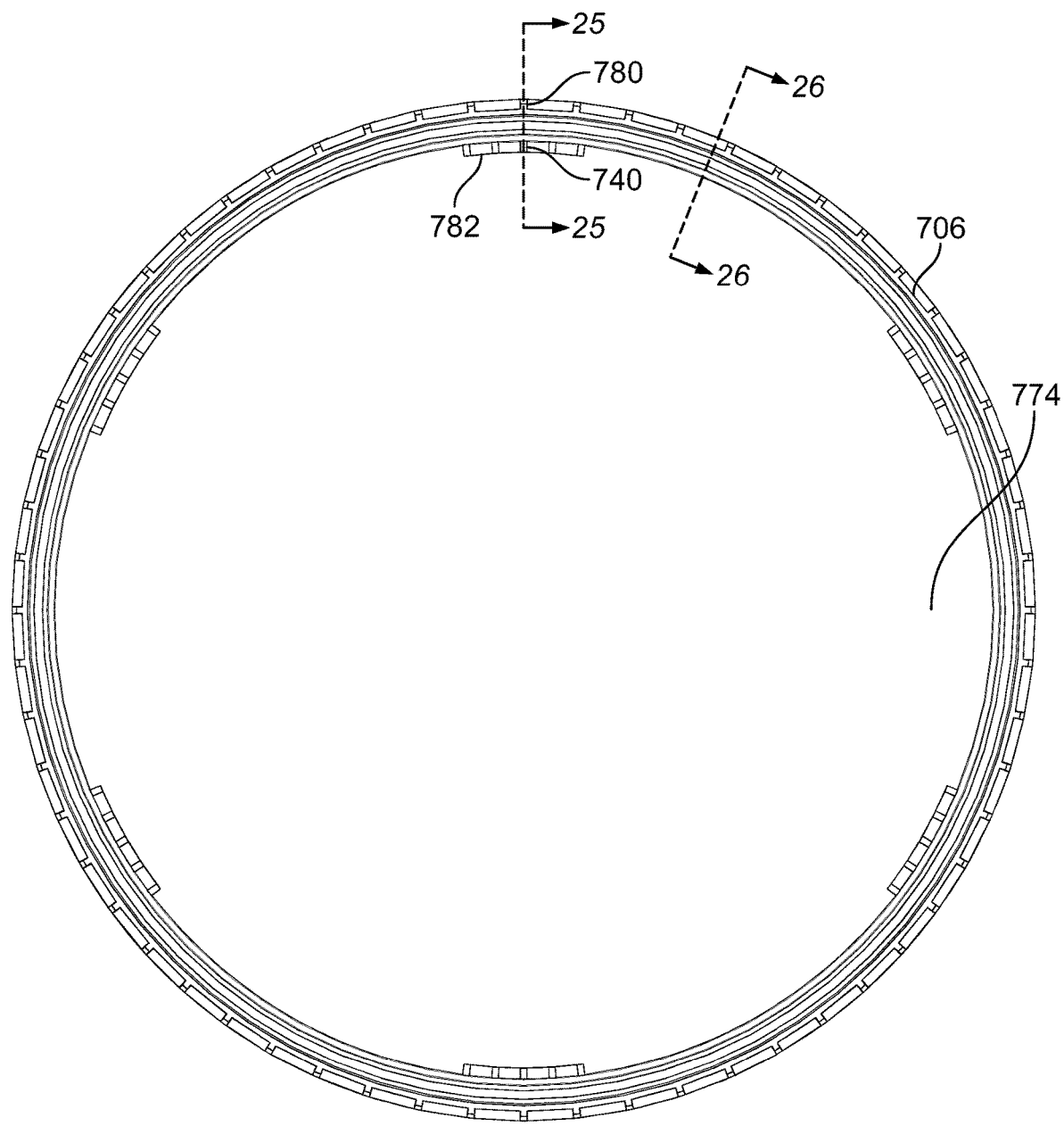
FIG. 24 is a plan view of the rotor of FIG. 20 showing radially outer barbs and radially inner barbs of the rotor.
Figure 26:
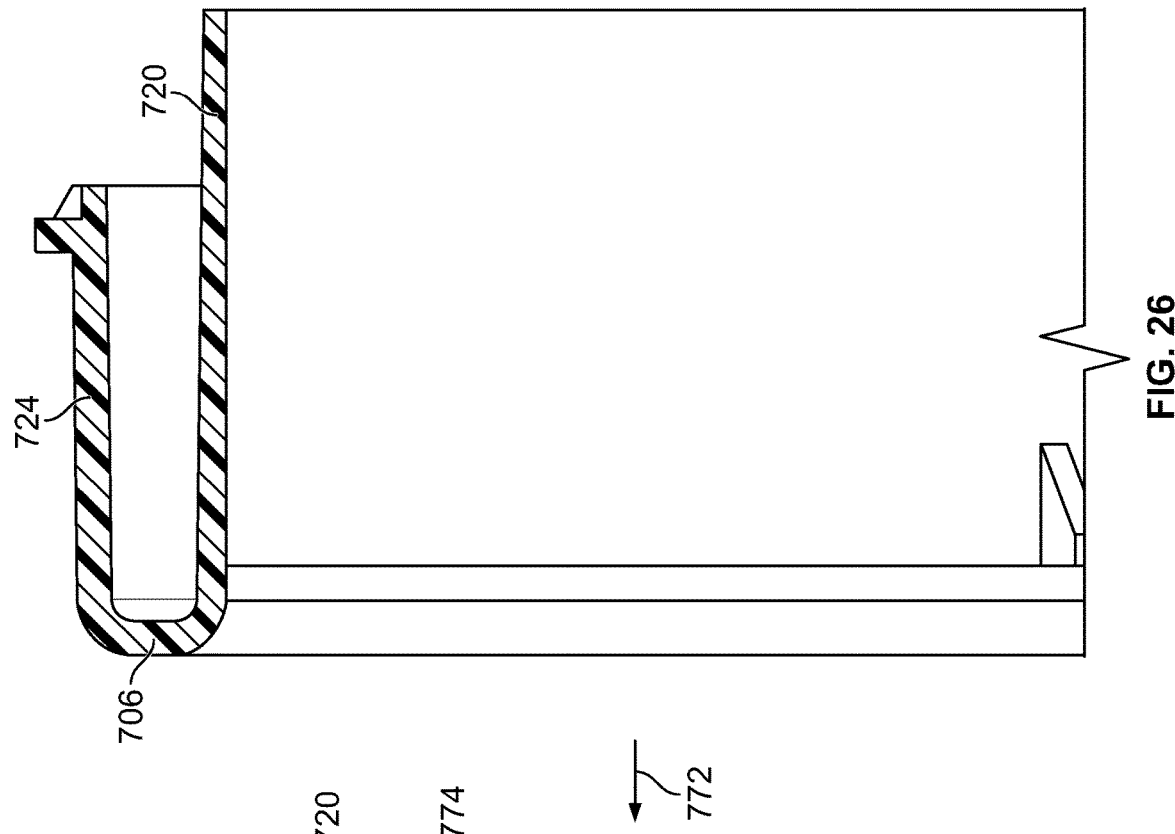
FIG. 26 is a cross-sectional view taken across line 26-26 in FIG. 24 showing a portion of the inner ring of the rotor without the radially inner barbs.

With reference to FIG. 24, the rotor 706 includes radially outer barbs 780 circumferentially spaced about the rotor 706. The rotor 706 includes one or more radially inner flanges 782 that include the barbs 740 thereon. The radially inner flanges 782 are spaced circumferentially about the rotor 706. Each flange 782 includes one or more barbs 740 that may be spaced apart from each other. With reference to FIG. 25, the barbs 740 extend radially inward from the inner ring 720 at the flanges 782. As shown in FIG. 26, the inner ring 720 has a continuous or uninterrupted wall intermediate the flanges 782 about the circumference of the rotor 706.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A rotor of a roller bearing seal assembly for a rail car, the rotor comprising:
   an annular body having a center axis;
   an intermediate annular wall of the annular body;
   a radially outer ring of the annular body extending from the intermediate annular wall in a first direction parallel to the center axis, the radially outer ring having a first end;
   at least one snap-fit member of the annular body, the at least one snap-fit member including a radially inner ring connected to the intermediate annular wall, the radially inner ring spaced radially inward from the radially outer ring to define a channel therebetween for receiving a portion of a seal case;
   the radially inner ring extending along the radially outer ring and having a second end axially even with or beyond the first end of the radially outer ring; and
   the at least one snap-fit member being configured to engage a snap-fit member of a slinger of the roller bearing seal assembly.

2. The rotor of claim 1 wherein the at least one snap-fit member includes a cam surface extending transverse to the center axis.

3. The rotor of claim 1 wherein the at least one snap-fit member includes a stop surface extending perpendicular to the center axis.

4. The rotor of claim 1 wherein the at least one snap-fit member includes at least one undercut to receive the snap-fit member of the slinger of the roller bearing seal assembly.

5. The rotor of claim 1 wherein the annular body has a unitary, one-piece construction.

6. The rotor of claim 1 wherein the at least one snap-fit member includes one of a barb and a stop surface configured to engage the other of the barb and stop surface of a slinger.

7. The rotor of claim 1 wherein the second end of the radially inner ring is axially beyond the first end of the radially outer ring.

8. A component of a roller bearing seal assembly for a rail car, the component comprising:
   an annular body having a center axis;
   an intermediate annular wall of the annular body extending radially;
   a ring of the annular body extending a first axial distance from the intermediate annular wall in a first direction parallel to the center axis;
   at least one snap-fit member of the annular body spaced radially from the ring and extending in the first direction from the intermediate annular wall a second axial distance that is less than the first axial distance;
   the at least one snap-fit member being configured to engage a snap-fit member of another component of the roller bearing seal assembly; and
   wherein the at least one snap-fit member includes an annular wall concentric with the ring and defining an annular channel therebetween.

9. The component of claim 8 wherein the annular body includes a shelf extending radially inward from the intermediate annular wall for supporting a slinger.

10. A roller bearing seal assembly comprising:
    a seal case;
    a rotor having a unitary, one-piece construction, the rotor including a ring;
    a slinger including a ring;
    a tapered surface of one of the rotor ring and the slinger ring configured to cammingly engage a surface of the other of the rotor ring and the slinger ring to permit the slinger ring and the rotor ring to be positioned concentrically with one another;
    at least one snap-fit connection of the rotor and slinger connecting the rotor and slinger so that the rotor and slinger are rotatable relative to the seal case about an axis;
    interfering portions of the seal case and the connected rotor and slinger limiting axial movement of the connected rotor and slinger relative to the seal case in a first axial direction and limiting axial movement of the connected rotor and slinger in a second axial direction opposite the first axial direction.

11. The roller bearing assembly of claim 10 wherein the surface of the other of the rotor ring and the slinger ring includes a tapered surface.

12. The roller bearing seal assembly of claim 10 wherein the tapered surface of the one of the rotor ring and the slinger ring is configured to deflect a portion of at least one of the rotor ring and the slinger ring and permit the slinger ring and rotor ring to be positioned concentrically with one another.

13. The roller bearing seal assembly of claim 10 wherein the at least one snap-fit connection includes a barb of the one of the rotor ring and the slinger ring, the barb including the tapered surface.

14. The roller bearing seal assembly of claim 10 wherein the interfering portions of the seal case and the connected rotor and slinger include surfaces of the seal case and rotor for abutting and limiting axial movement of the connected rotor and slinger relative to the seal case in the first axial direction; and wherein the interfering portions of the seal case and connected rotor and slinger include surfaces of the seal case and slinger for abutting and limiting axial movement of the connected rotor and slinger relative to the seal case in the second axial direction.

15. The roller bearing seal assembly of claim 10 wherein the at least one snap-fit connection of the slinger and the rotor includes stop surfaces of the slinger and rotor extending transverse to the axis.

16. The roller bearing seal assembly of claim 10 wherein the slinger ring has a tapered collar portion configured to compliment a tapered surface of a wear ring.

17. A roller bearing seal assembly of comprising:
    a seal case;
    a rotor having a unitary, one-piece construction connected to the seal case and rotatable relative to the seal case about an axis; and
    interfering portions of the seal case and the rotor limiting axial separation of the rotor and the seal case;
    wherein the interfering portions include stop surfaces extending transverse to the axis configured to abut and limit axial separation of the rotor and seal case.

18. The roller bearing seal assembly of claim 17 wherein the interfering portions include protrusions of the seal case and the rotor.

19. The roller bearing seal assembly of claim 17 wherein the seal case includes an annular wall limiting axial movement of the rotor relative to the seal case in a first axial direction and the interfering portions of the seal case and the rotor limit axial movement in a second axial direction opposite the first axial direction.

20. The roller bearing seal assembly of claim 17 wherein the interfering portions include a plurality of deflectable tabs of one of the rotor and the seal case.

21. The roller bearing seal assembly of claim 20 wherein the one of the rotor and the seal case includes a through opening at each of the tabs.

22. The roller bearing seal assembly of claim 20 wherein the interfering portions include an annular snap-fit member of the other of the rotor and the seal case.

23. The roller bearing seal assembly of claim 17 wherein the interfering portions include an annular wall of one of the seal case and the rotor and a plurality of protrusions of the other of the seal case and the rotor that engage the annular wall and limit separation of the seal case and the rotor.

24. The roller bearing seal assembly of claim 17 wherein the seal case includes an outer case and an insert assembled with the outer case; and
    the interfering portions include portions of the insert and the rotor.

25. A roller bearing seal assembly comprising:
    a seal case;
    a rotor having a unitary, one-piece construction connected to the seal case and rotatable relative to the seal case about an axis;
    interfering portions of the seal case and the rotor limiting axial separation of the rotor and the seal case; and
    a slinger mounted to the rotor.

26. The roller bearing seal assembly of claim 25 wherein the slinger and the rotor include interfering portions limiting axial separation of the slinger and the rotor.

\* \* \* \* \*